United States Patent
Oishi et al.

(10) Patent No.: US 9,667,858 B2
(45) Date of Patent: May 30, 2017

(54) IMAGE ACQUISITION DEVICE AND IMAGE ACQUISITION DEVICE FOCUSING METHOD

(71) Applicant: HAMAMATSU PHOTONICS K.K., Hamamatsu-shi, Shizuoka (JP)

(72) Inventors: Hideshi Oishi, Hamamatsu (JP); Masaharu Tokiwa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/897,097

(22) PCT Filed: Mar. 7, 2014

(86) PCT No.: PCT/JP2014/055986
§ 371 (c)(1),
(2) Date: Dec. 9, 2015

(87) PCT Pub. No.: WO2014/199685
PCT Pub. Date: Dec. 18, 2014

(65) Prior Publication Data
US 2016/0142617 A1    May 19, 2016

(30) Foreign Application Priority Data

Jun. 11, 2013  (JP) .................................. 2013-122956

(51) Int. Cl.
| | |
|---|---|
| *H04N 5/232* | (2006.01) |
| *H04N 5/238* | (2006.01) |
| *H04N 5/341* | (2011.01) |
| *H04N 5/378* | (2011.01) |
| *H04N 5/369* | (2011.01) |
| *G03B 13/36* | (2006.01) |
| *G02B 21/36* | (2006.01) |
| *G02B 7/36* | (2006.01) |
| *G02B 21/24* | (2006.01) |

(52) U.S. Cl.
CPC .......... *H04N 5/23212* (2013.01); *G02B 7/36* (2013.01); *G02B 21/245* (2013.01);
(Continued)

(58) Field of Classification Search
CPC .... G02B 21/36; G02B 21/361; G02B 21/362; G02B 21/364; G02B 21/365;
(Continued)

(56) References Cited

U.S. PATENT DOCUMENTS

| | | |
|---|---|---|
| 4,083,056 A | 4/1978 | Nakamura et al. |
| 4,349,254 A | 9/1982 | Jyojiki et al. |

(Continued)

FOREIGN PATENT DOCUMENTS

| | | |
|---|---|---|
| JP | S58-208946 | 12/1983 |
| JP | H06-75164 A | 3/1994 |

(Continued)

OTHER PUBLICATIONS

Machine english Translation of JP 11-218670 A, Kotaki, (Aug. 10, 1999).*

(Continued)

*Primary Examiner* — Nelson D. Hernández Hernández
(74) *Attorney, Agent, or Firm* — Drinker Biddle & Reath LLP

(57) ABSTRACT

In an image acquisition device, an optical path length difference in a second light figure can be formed by arrangement of an optical path difference generating member, without need for splitting light in a second optical path for focus control. Therefore, it reduces the quantity of light into the second optical path necessary for acquisition of information of focal position while ensuring the quantity of light enough for execution of imaging by a first imaging device. Furthermore, in this image acquisition device, a light reduction portion is provided between a first face and a second face of the optical path difference generating member. This light reduction portion can narrow a light superimposed region on the imaging surface of the second imaging device, which allows control of the focal position to a sample to be accurately carried out.

9 Claims, 21 Drawing Sheets

(52) U.S. Cl.
CPC ............ *G02B 21/365* (2013.01); *G03B 13/36* (2013.01); *H04N 5/238* (2013.01); *H04N 5/341* (2013.01); *H04N 5/3696* (2013.01); *H04N 5/378* (2013.01)

(58) Field of Classification Search
CPC ...... G02B 21/367; G02B 21/368; G02B 7/04; G06T 2207/10056
See application file for complete search history.

(56) References Cited

U.S. PATENT DOCUMENTS

| | | |
|---|---|---|
| 4,533,826 A | 8/1985 | van Alem |
| 4,659,917 A | 4/1987 | Suzuki et al. |
| 2004/0042780 A1 | 3/2004 | Kindaichi et al. |
| 2004/0149882 A1 | 8/2004 | Sasaki et al. |
| 2013/0342660 A1* | 12/2013 | Iwasaki ................. G02B 27/14 348/47 |

FOREIGN PATENT DOCUMENTS

| | | |
|---|---|---|
| JP | H08-320430 A | 12/1996 |
| JP | H11-218670 A | 8/1999 |
| WO | WO-2005/114293 A1 | 12/2005 |
| WO | WO 2012/117617 | 9/2012 |

OTHER PUBLICATIONS

International Preliminary Report on Patentability dated Dec. 23, 2015 for PCT/JP2014/055986.

* cited by examiner

Fig.9
(a)
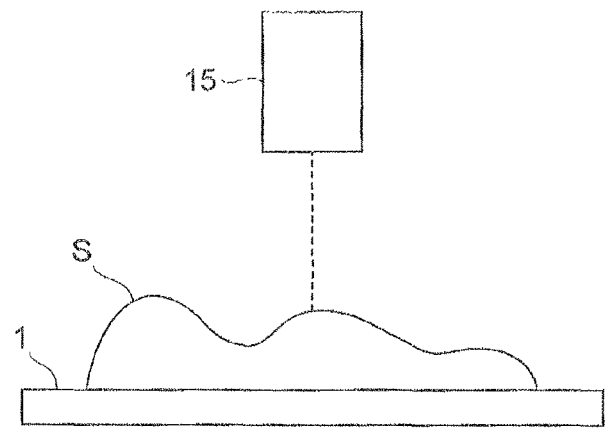
(b)
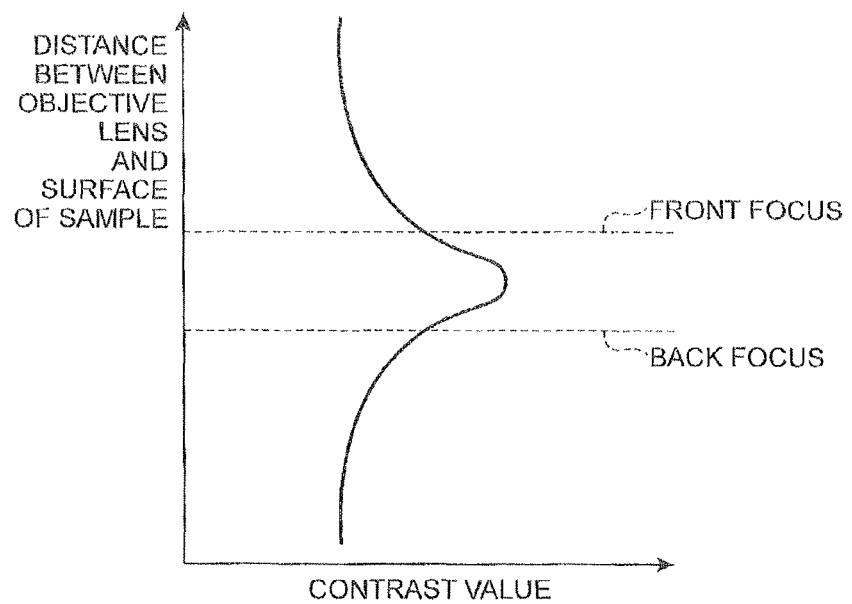

Fig.10
(a)
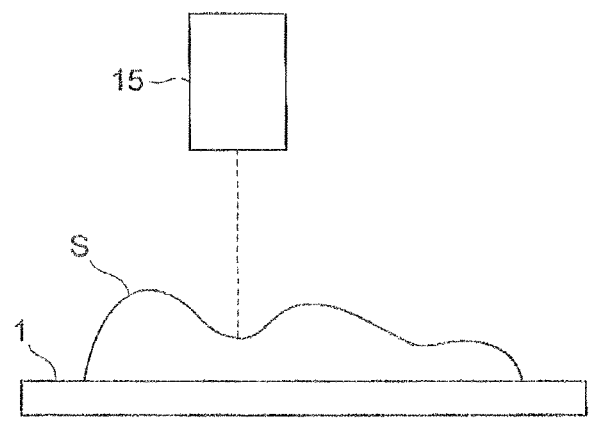
(b)
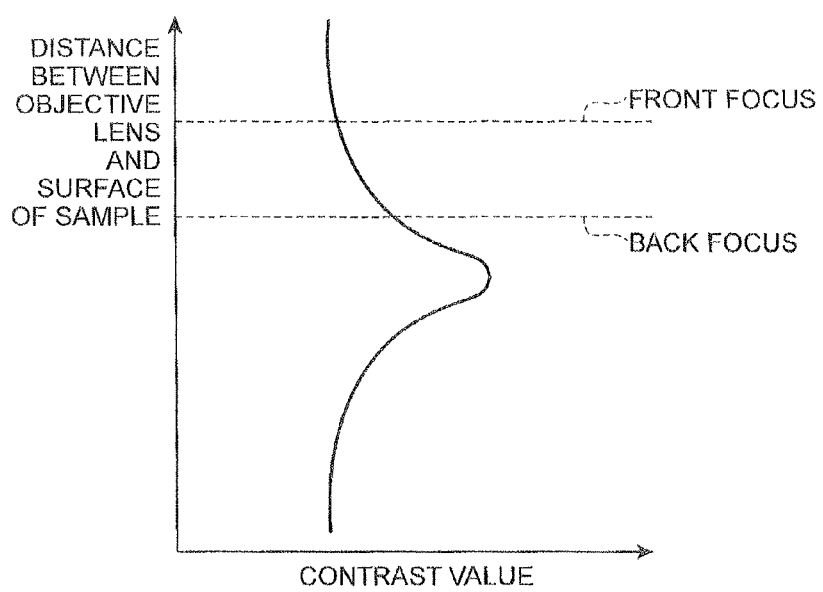

*Fig.11*
(a)
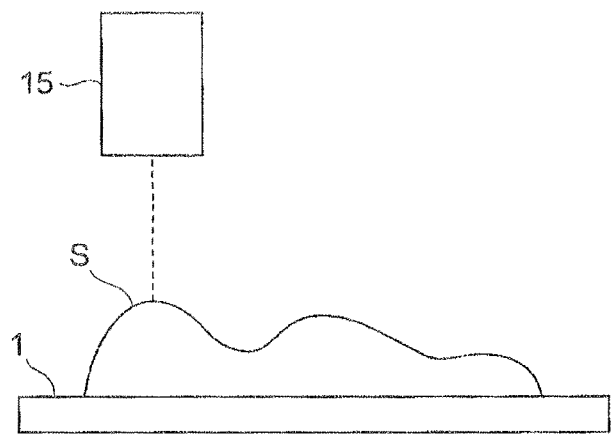
(b)
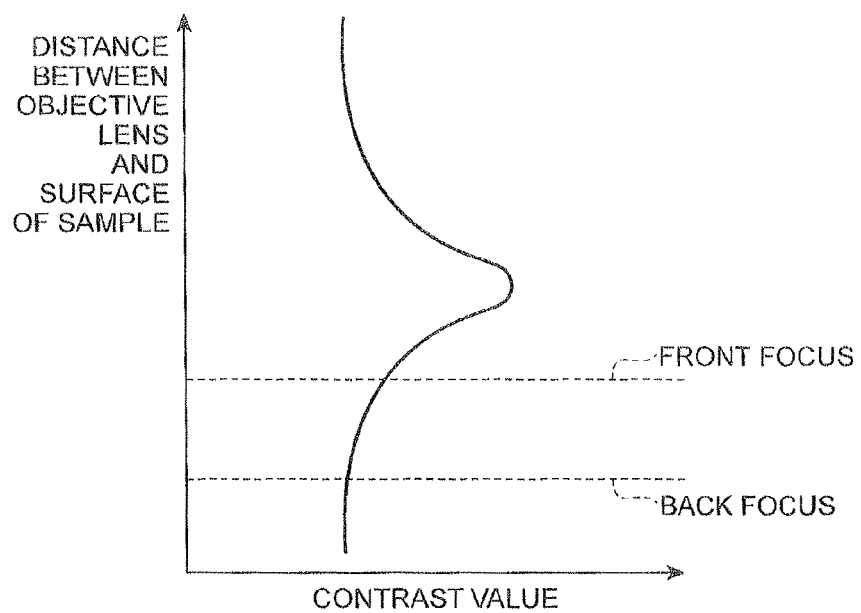

IMAGE ACQUISITION DEVICE AND IMAGE ACQUISITION DEVICE FOCUSING METHOD

TECHNICAL FIELD

The present invention relates to an image acquisition device and an image acquisition device focusing method.

BACKGROUND

As a conventional image acquisition device, there is, for example, the device described in Patent Literature 1. In this device, light from a specimen is split by a half prism to be received by a photoelectric conversion element consisting of a two-dimensional image pickup element such as a CCD area image sensor. A control circuit for the photoelectric conversion element has a scan area setting unit capable of setting two arbitrary scan areas for two-dimensional scanning on a light receiving surface. Then, focusing control is executed based on a focus deviation signal of the light received in the two scan areas set by the scan area setting unit.

CITATION LIST

Patent Literature

Patent Literature 1: Japanese Unexamined Patent Publication No. H8-320430

SUMMARY OF INVENTION

Technical Problem

The foregoing conventional device is adapted to split the light from the specimen with the use of the half prism. For this reason, it is difficult to ensure the quantity of light enough on the photoelectric conversion element, which may result in degradation of detection accuracy in detecting a focal position to the specimen. If the quantity of light is increased for the light for detection of the focal position, it will lead to reduction in quantity of light for imaging of the specimen, raising a possibility that it is difficult to ensure the quantity of light enough for the imaging.

The present invention has been accomplished in order to solve the above problem and it is an object of the present invention to provide an image acquisition device and a focusing method thereof capable of ensuring the quantity of light enough for imaging and accurately detecting the focal position to a sample.

Solution to Problem

In order to solve the above problem, an image acquisition device according to the present invention comprises: a stage for a sample to be mounted thereon; stage control means for scanning the stage at a predetermined speed; a light source for applying light to the sample; a lightguide optical system including light splitting means for splitting a optical image of the sample into a first optical path for image acquisition and a second optical path for focus control; first imaging means for acquiring a first image formed by a first optical image split into the first optical path; second imaging means for acquiring a second image formed by a second optical image split into the second optical path; focus control means for performing an analysis of the second image and controlling a focal position in imaging by the first imaging means, based on the result of the analysis; and an optical path difference generating member arranged in the second optical path and adapted to generate an optical path difference in the second optical image along an in-plane direction of an imaging surface of the second imaging means, wherein the optical path difference generating member has a first face and a second face tilted relative to a plane orthogonal to an optical axis of the second optical path, and wherein a light reduction portion for reducing light reaching the imaging surface is provided between the first face and the second face.

In this image acquisition device, the optical path length difference in the second optical image can be formed by the arrangement of the optical path difference generating member, without need for splitting the light in the second optical path for focus control. Therefore, it can reduce the quantity of light into the second optical path necessary for acquisition of information of the focal position, while ensuring the quantity of light enough for execution of imaging by the first imaging means. In this image acquisition device, the optical path difference generating member has the first face and the second face, which makes it feasible to perform bidirectional scanning to scan an imaging field of the sample in two ways. In the vicinity of a boundary between the first face and the second face, beams refracted at the first face and at the second face may be superimposed in part on the imaging surface of the second imaging means. It is considered that the presence of a light superimposed region on the imaging surface would lead to degradation of analysis accuracy of the second image in the focus control means. In contrast to it, this image acquisition device is configured so that the light reduction portion for reducing the light reaching the imaging surface of the second imaging means is provided between the first face and the second face. This light reduction portion can narrow the light superimposed region on the imaging surface of the second imaging means, which allows the control of the focal position to the sample to be accurately carried out.

Preferably, the optical path difference generating member has a third face orthogonal to the optical axis of the second optical path between the first face and the second face, and the light reduction portion is provided on the third face. In this case, the third face can suppress occurrence of refraction of light. Furthermore, the light reduction portion is provided on the third face, whereby the light superimposed region on the imaging surface of the second imaging means can be more definitely narrowed.

Preferably, the first face and the second face are adjacent to each other, and the light reduction portion is provided so as to include a boundary region between the first face and the second face. In this case, the light reduction portion is provided so as to include the boundary region between the first face and the second face, whereby the superimposed region of light on the imaging surface of the second imaging means can be more definitely narrowed.

Preferably, the light reduction portion is a light reflection portion for reflecting the light from the second optical path. In this case, the light reflection portion can more definitely narrow the light superimposed region on the imaging surface of the second imaging means.

Preferably, the light reduction portion is a light attenuation portion for attenuating the light from the second optical path. In this case, the light attenuation portion can more definitely narrow the light superimposed region on the imaging surface of the second imaging means.

Preferably, the light reduction portion is a light block portion for blocking the light from the second optical path. In this case, the light block portion can more definitely narrow the light superimposed region on the imaging surface of the second imaging means.

Preferably, the light reduction portion is a light absorption portion for absorbing the light from the second optical path. In this case, the light absorption portion can more definitely narrow the light superimposed region on the imaging surface of the second imaging means.

Preferably, the image acquisition device further comprises: region control means for setting a first imaging region and a second imaging region on the imaging surface of the second imaging means so as to avoid a light superimposed region where beams refracted at the first face and at the second face of the optical path difference generating member are superimposed. This allows the device to image each of a optical image (of front focus) in focus in front of the optical image incident to the first imaging means and a optical image (of back focus) in focus behind the optical image incident to the first imaging means, in the first imaging region and in the second imaging region of the second imaging means. Since the light reduction portion can narrow the superimposed region of light on the imaging surface of the second imaging means, it becomes feasible to expand a setting region available for setting of the first imaging region and the second imaging region. This makes it feasible to adequately expand the focus difference between front focus and back focus, thereby permitting the control of the focal position to be accurately performed.

Preferably, the second imaging means has a two-dimensional image pickup element having a plurality of pixel rows and being capable of rolling readout, and the second image is acquired by performing rolling readout of each pixel row in synchronism with the scanning of the stage by the stage control means. In this case, image data from each pixel row allows acquisition of contrast information at an identical part of the sample by a single rolling readout operation. Therefore, focal point information can be quickly and accurately calculated based on the contrast information.

An image acquisition device focusing method according to the present invention is a method for focusing an image acquisition device comprising: a stage for a sample to be mounted thereon; stage control means for scanning the stage at a predetermined speed; a light source for applying light to the sample; a lightguide optical system including light splitting means for splitting a optical image of the sample into a first optical path for image acquisition and a second optical path for focus control; first imaging means for acquiring a first image formed by a first optical image split into the first optical path; second imaging means for acquiring a second image formed by a second optical image split into the second optical path; and focus control means for performing an analysis of the second image and controlling a focal position in imaging by the first imaging means, based on the result of the analysis, the method comprising: arranging in the second optical path an optical path difference generating member having a first face and a second face tilted relative to a plane orthogonal to an optical axis of the second optical path and adapted to generate an optical path difference in the second optical image along an in-plane direction of an imaging surface of the second imaging means; and providing a light reduction portion between the first face and the second face to reduce light reaching the imaging surface of the second imaging means.

In this image acquisition device focusing method, the optical path length difference in the second optical image can be formed by the arrangement of the optical path difference generating member, without need for splitting the light in the second optical path for focus control. Therefore, it reduces the quantity of light into the second optical path necessary for acquisition of information of the focal position, while ensuring the quantity of light enough for execution of imaging by the first imaging means. In this image acquisition device focusing method, the optical path difference generating member has the first face and the second face, which makes it feasible to perform bidirectional scanning to scan an imaging field of the sample in two ways. In the vicinity of a boundary between the first face and the second face, beams refracted at the first face and at the second face may be superimposed in part on the imaging surface of the second imaging means. It is considered that the presence of a light superimposed region on the imaging surface would lead to degradation of analysis accuracy of the second image in the focus control means. In contrast to it, this image acquisition device focusing method is configured so that the light reduction portion for reducing the light reaching the imaging surface of the second imaging means is provided between the first face and the second face. This light reduction portion can narrow the light superimposed region on the imaging surface of the second imaging means, which allows the control of the focal position to the sample to be accurately carried out.

Advantageous Effects of Invention

The present invention has enabled the focal position relative to the sample to be accurately detected, while ensuring the quantity of light enough for imaging.

BRIEF DESCRIPTION OF DRAWINGS

FIG. 9 is a drawing showing the result of an analysis of contrast values in a situation where the distance to the surface of a sample is coincident with the focal length of an objective lens.

FIG. 10 is a drawing showing the result of an analysis of contrast values in a situation where the distance to the surface of the sample is longer than the focal length of the objective lens.

FIG. 11 is a drawing showing the result of an analysis of contrast values in a situation where the distance to the surface of the sample is shorter than the focal length of the objective lens.

DESCRIPTION OF EMBODIMENTS

Preferred embodiments of the image acquisition device and the image acquisition device focusing method according to the present invention will be described below in detail with reference to the drawings.

Figure 1:
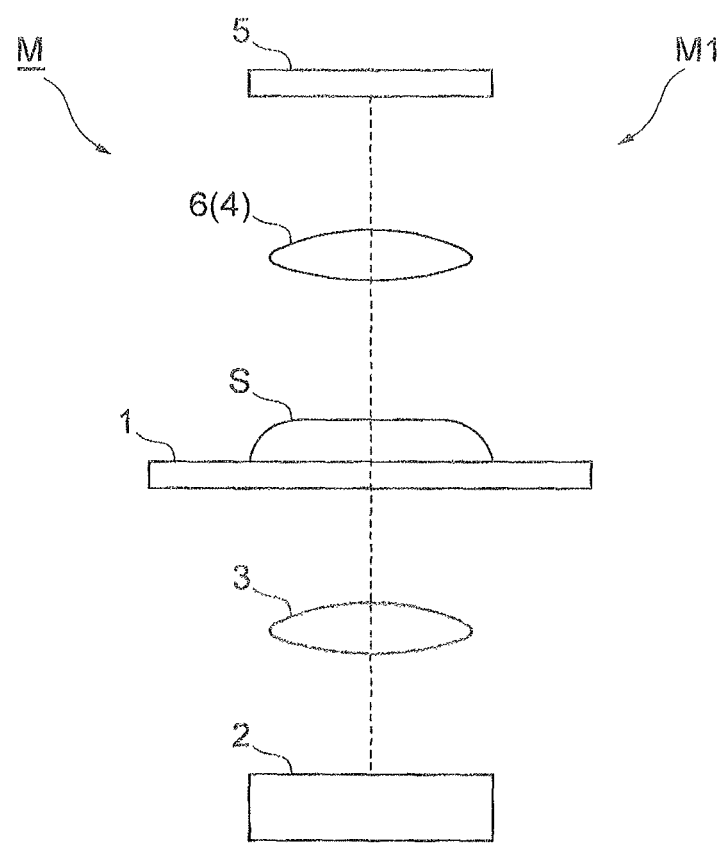
FIG. 1 is a drawing showing an embodiment of a macro image acquisition device forming an image acquisition device according to the present invention.
Figure 2:
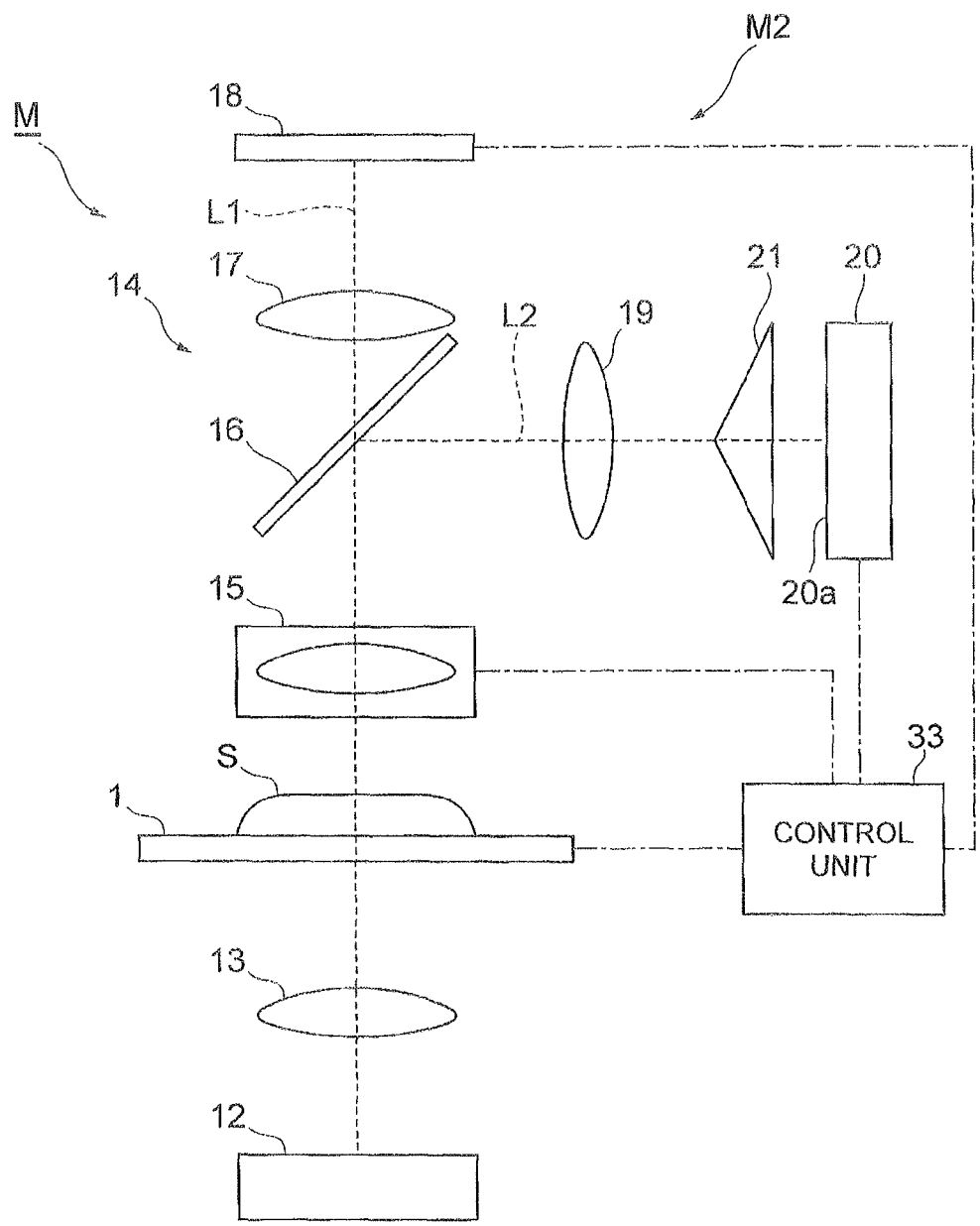
FIG. 2 is a drawing showing an embodiment of a micro image acquisition device forming the image acquisition device according to the present invention.
Figure 13:
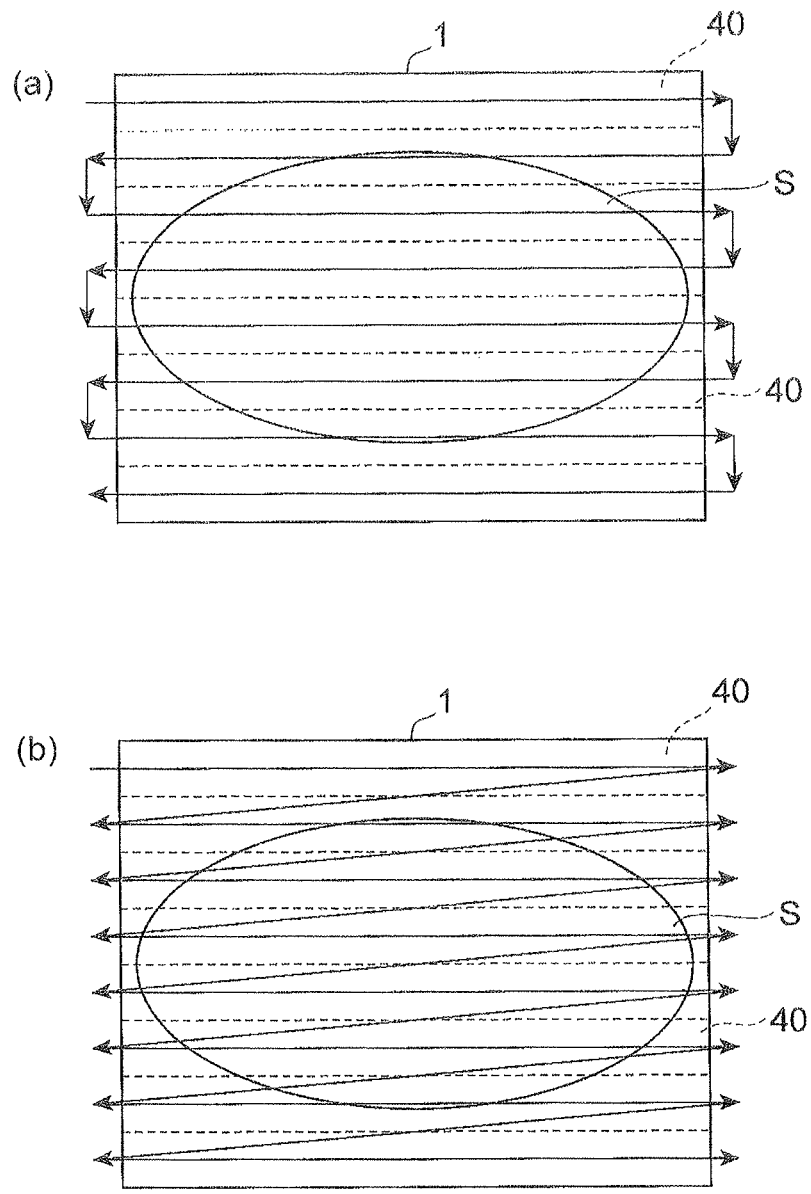
FIG. 13 is a drawing showing control of scanning direction of the stage by a stage controller.

FIG. 1 is a drawing showing an embodiment of a macro image acquisition device forming the image acquisition device according to the present invention. FIG. 2 is a drawing showing an embodiment of a micro image acquisition device forming the image acquisition device according to the present invention. As shown in FIGS. 1 and 2, the image acquisition device M is composed of the macro image acquisition device M1 for acquiring a macro image of a sample S and the micro image acquisition device M2 for acquiring a micro image of the sample S. The image acquisition device M is a device that sets, for example, a plurality of linear divisional regions 40 (cf. FIG. 13) in the macro image acquired by the macro image acquisition device M1, acquires images of the respective divisional regions 40 at a high magnification by the micro image acquisition device M2, and combines the images to generate a virtual slide image as a digital image.

The macro image acquisition device M1, as shown in FIG. 1, has a stage 1 on which the sample S is to be mounted. The stage 1 is, for example, an XY stage which is driven horizontally by a motor or actuator such as a stepping motor (pulse motor) or piezoelectric actuator. The sample S to be observed by the image acquisition device M is, for example, a biological sample such as a cell and is mounted on the stage 1 while hermetically enclosed in a glass slide. The imaging position on the sample S can be moved by driving this stage 1 in the XY plane.

The stage 1 can be moved back and forth between the macro image acquisition device M1 and the micro image acquisition device M2 and thus has a function to convey the sample S between the two devices. In acquisition of the macro image, the entire image of the sample S may be acquired by a single imaging operation or the sample S may be imaged as divided into a plurality of regions. Furthermore, the stage 1 may be provided for each of both the macro image acquisition device M1 and the micro image acquisition device M2.

Arranged on the bottom side of the stage 1 are a light source 2 for applying light to the sample S and a condensing lens 3 for condensing the light from the light source 2 onto the sample S. The light source 2 may be arranged so as to obliquely apply the light to the sample S. Arranged on the top side of the stage 1 are a lightguide optical system 4 for guiding a optical image from the sample S and an imaging device 5 for imaging the optical image of the sample S. The lightguide optical system 4 has an imaging lens 6 for focusing the optical image from the sample S on an imaging surface of the imaging device 5. The imaging device 5 is, for example, an area sensor capable of acquiring a two-dimensional image. The imaging device 5 acquires the entire image of the optical image of the sample S impinging through the lightguide optical system 4 onto the imaging surface, and stores it into a below-described virtual slide image storage 39.

The micro image acquisition device M2, as shown in FIG. 2, has a light source 12 and a condensing lens 13 similar to those in the macro image acquisition device M1, on the bottom side of the stage 1. Furthermore, a lightguide optical system 14 for guiding a optical image from the sample S is arranged on the top side of the stage 1. The optical system to be employed for applying the light from the light source 12 may be an excitation light applying optical system for applying excitation light to the sample S or a dark field illumination optical system for acquiring a dark field image of the sample S.

The lightguide optical system 14 has an objective lens 15 arranged opposite to the sample S and a beam splitter (light splitting means) 16 arranged behind the objective lens 15. The objective lens 15 is provided with a motor or actuator such as a stepping motor (pulse motor) or piezoelectric actuator for driving the objective lens 15 in Z directions orthogonal to a mount surface of the stage 1. The focal position in imaging for acquisition of images of the sample S can be adjusted by changing the Z-directional position of the objective lens 15 by these driving means. The adjustment of focal position may be carried out by changing the Z-directional position of the stage 1 or by changing the Z-directional positions of both of the objective lens 15 and the stage 1.

The beam splitter 16 is a part that splits the optical image of the sample S into a first optical path L1 for image acquisition and a second optical path L2 for focus control. This beam splitter 16 is arranged at an angle of about 45 degrees to the optical axis from the light source 12; in FIG. 2, the optical path passing through the beam splitter 16 is the first optical path L1, while the optical path reflected by the beam splitter 16 is the second optical path.

Arranged in the first optical path L1 are an imaging lens 17 for imaging a optical image (first optical image) of the sample S having passed through the beam splitter 16 and a first imaging device (first imaging means) 18 having an imaging surface arranged at an image formation position of the imaging lens 17. The first imaging device 18 is a device that can acquire a one-dimensional image (first image)

formed by the first optical image of the sample S, e.g., a two-dimensional image CCD sensor capable of TDI (Time Delay Integration) driving, or a line sensor. When it is driven by a method of sequentially acquiring images of the sample S while controlling the stage 1 at a constant speed, the first imaging device 18 may be a device that can acquire a two-dimensional image, such as a CMOS image sensor or a CCD image sensor. The first images taken by the first imaging device 18 are sequentially stored in a temporary storage memory such as a lane buffer and then compressed to be output to a below-described image generator 38.

On the other hand, arranged on the second optical path L2 are a field adjustment lens 19 for reducing a optical image (second optical image) of the sample having been reflected by the beam splitter 16, and a second imaging device (second imaging means) 20. An optical path difference generating member 21 for generating an optical path difference in the second optical image is arranged in front of the second imaging device 20. The field adjustment lens 19 is preferably configured so as to focus the second optical image in the size approximately equal to that of the first optical image on the second imaging device 20.

The second imaging device 20 is a device that can acquire a two-dimensional image (second image) formed by the second optical image of the sample S, and is configured, for example, using an area image sensor such a CMOS (Complementary Metal Oxide Semiconductor) image sensor or a CCD (Charge Coupled Device) image sensor. Furthermore, a line sensor may be used.

Figure 3:
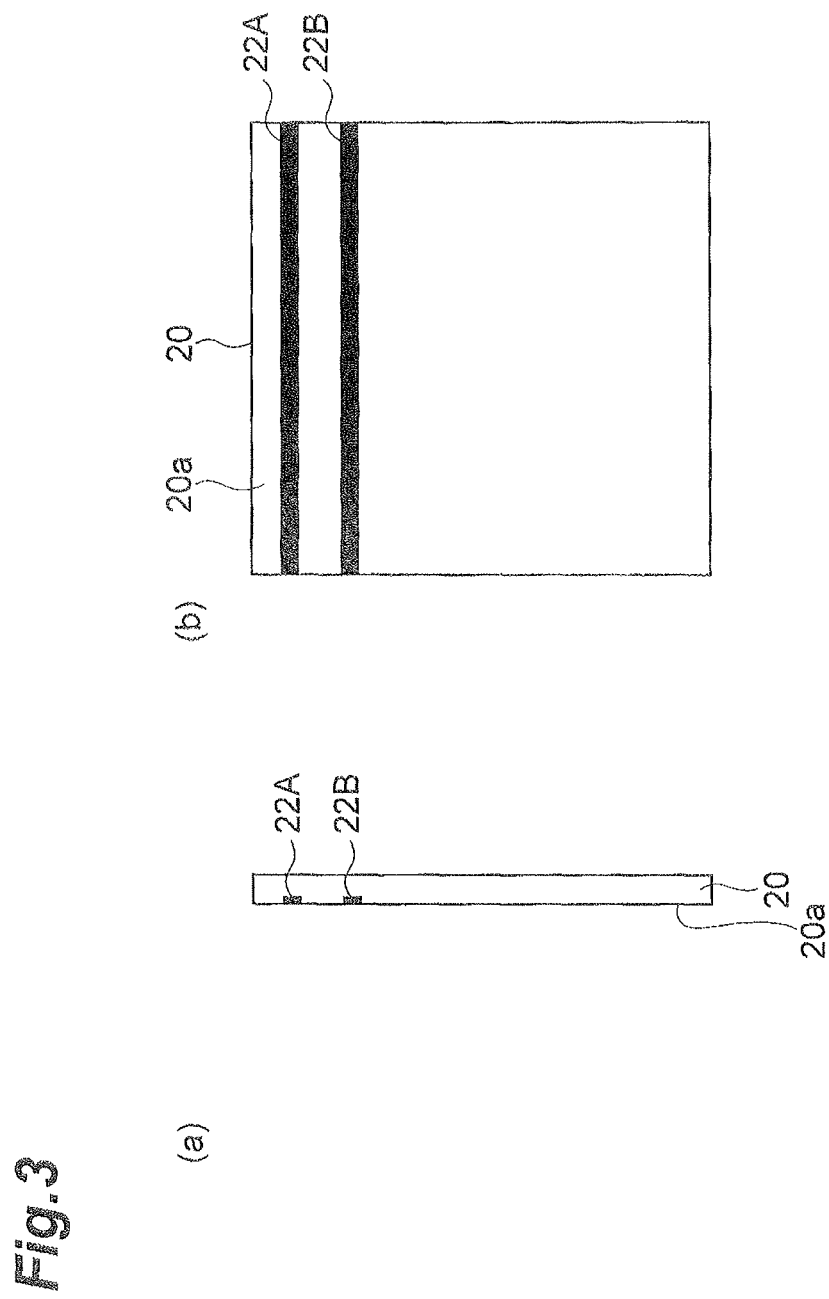
FIG. 3 is a drawing showing an example of a second imaging device.

An imaging surface 20a of the second imaging device 20 is arranged so as to coincide with an XZ plane orthogonal to the second optical path L2. On this imaging surface 20a, as shown in FIG. 3, a first imaging region 22A and a second imaging region 22B for acquiring partial images of the second optical image are set. The first imaging region 22A and the second imaging region 22B are set along a direction perpendicular to a moving direction of the second optical image (scanning direction: Z-direction) on the imaging surface 20a with scanning of the sample S. The first imaging region 22A and the second imaging region 22B are set with a predetermined space in between and each region acquires a part of the second optical image as a linear image. This allows the device to acquire a optical image in the same region as the first optical image of the sample S acquired by the first imaging device 18, as the second optical image in the first imaging region 22A and in the second imaging region 22B. The first imaging region 22A and the second imaging region 22B may be set by use of separate line sensors. In this case, by separately controlling the line sensors, it becomes feasible to reduce the time necessary for setting the first imaging region 22A and the second imaging region 22B.

The optical path difference generating member 21 is a glass member for generating an optical path difference in the second optical image along an in-plane direction of the imaging surface 20a. In the example shown in FIG. 4(a), the optical path difference generating member 21 is of a prism shape with a triangular cross section and is arranged so that an apex 24 thereof is approximately coincident with a Z-directional central portion of the imaging surface 20a. Therefore, the second optical image incident to the imaging surface 20a has the longest optical path in the Z-directional central portion of the imaging surface 20a and the optical path becomes shorter toward the Z-directional two end portions of the imaging surface 20a. The optical path difference generating member 21 is preferably arranged so that a face 25 opposed to the second imaging device 20 is parallel to the imaging surface 20a of the second imaging device. This can reduce refraction of light at the opposed face 25 to the second imaging device 20 and ensure the quantity of light enough to be received by the second imaging device 20.

The arrangement of this optical path difference generating member 21 allows the second imaging device 20 to acquire a optical image in focus in front of the first optical image incident to the first imaging device 18 (front focus) and a optical image in focus behind the first optical image (back focus), based on the position of the first imaging region 22A and the position of the second imaging region 22B. In the present embodiment, the position of the first imaging region 22A and the position of the second imaging region 22B are set, for example, so that the first imaging region 22A is in front focus and the second imaging region 22B is in back focus. The focus difference between front focus and back focus is dependent on differences between the thickness t1 and refractive index of the optical path difference generating member 21 where the second optical image to enter the first imaging region 22A passes, and the thickness t2 and refractive index of the optical path difference generating member 21 where the second optical image to enter the second imaging region 22B passes.

Figure 4:
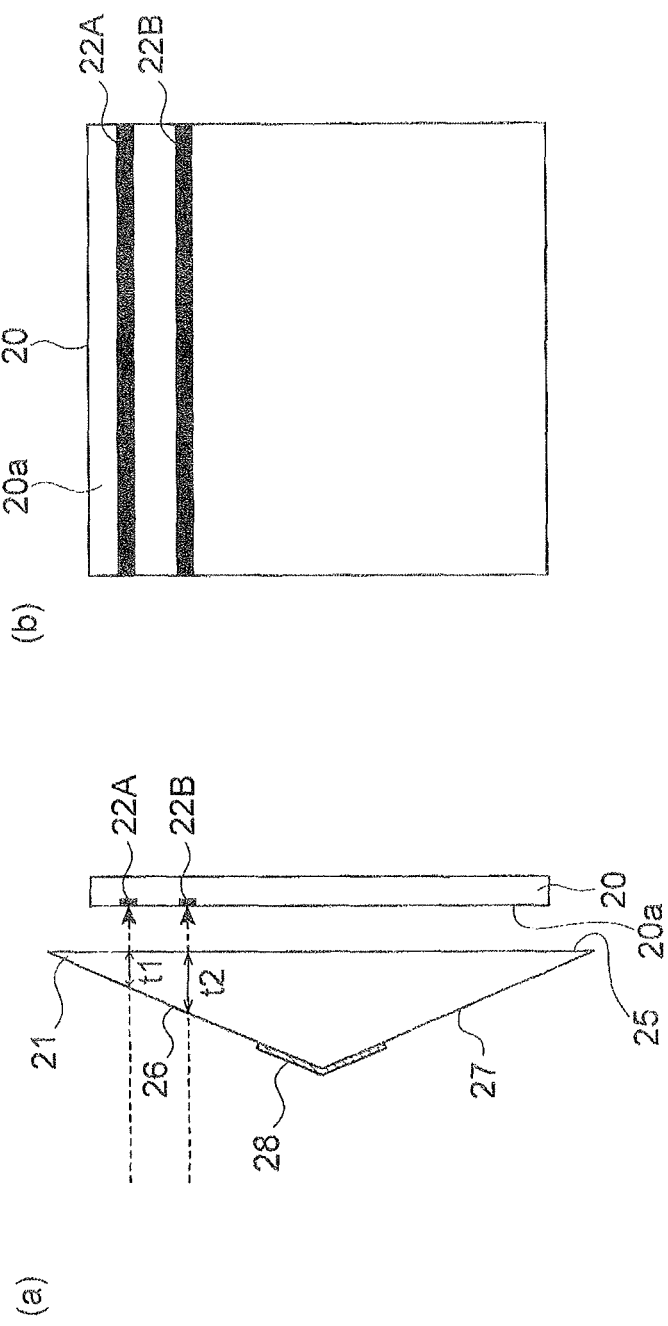
FIG. 4 is a drawing showing an example of a combination of an optical path difference generating member with the second imaging device.

The optical path difference generating member 21, as shown in FIG. 4(a), has a first face 26 and a second face 27 tilted relative to a plane orthogonal to the optical axis of the second optical path L2 (the opposed face 25 herein). The first face 26 and the second face 27 are tilted both at about 30° to the opposed face 25 so as to be symmetric with respect to the apex 24. The first face 26 and the second face 27 cause the light from the second optical path L2 to be refracted inward at the first face 26 and at the second face 27 so as to impinge upon the imaging surface 20a. The length in the moving direction of the second optical image in the opposed face 25 of the optical path difference generating member 21 is preferably longer than the length in the moving direction of the second optical image in the imaging surface 20a of the second imaging device 20. In this case, it becomes possible to make the light refracted at the upper end side of the first face 26 or at the lower end side of the second face 27, incident to the end of the imaging surface 20a, allowing effective utilization of the pixel rows located at the ends of the imaging surface 20a.

Since the optical path difference generating member 21 is provided with the first face 26 and the second face 27, the device can adapt to bidirectional scanning of the imaging field of the sample S (cf. FIG. 13(a)). In the case where the bidirectional scanning is carried out, the first imaging region 22A and the second imaging region 22B may be set in order from the top in the upper half region of the imaging surface 20a corresponding to the first face 26 during one-directional scanning and the first imaging region 22A and the second imaging region 22B may be set in order from the bottom in the lower half region of the imaging surface 20a corresponding to the second face 27 during the other-directional scanning, depending upon the moving direction of the second optical image on the imaging surface 20a with scanning of the sample S (cf. FIG. 4(b)).

In the optical path difference generating member 21, a light reduction portion 28 for reducing light reaching the imaging surface 20a of the second imaging device 20 is provided between the first face 26 and the second face 27. The light reduction portion 28 extends in directions perpendicular to the moving direction of the second optical image (scanning direction: Z-direction), along the apex 24 so as to hang over the first face 26 side and the second face 27 side in an equal width with respect to the apex 24 at a center.

The light reduction portion 28 can be a light reflection portion that reflects the light from the second optical path L2. In the case of the light reflection portion, it may be made, for example, by pasting foil of a metal such as aluminum, gold, silver, or copper, to the optical path difference generating member 21 or by evaporating any one of these metals onto the optical path difference generating member 21 to form a film. The light reduction portion 28 can be a light attenuation portion for attenuating the light from the second optical path L2 or a light block portion for blocking the light from the second optical path L2. In the cases of the light attenuation portion and the light block portion, for example, a black paint may be applied onto the optical path difference generating member 21 or a black seal material may be attached to the optical path difference generating member 21. Furthermore, a black paint may be applied to the surface of the aforementioned metal film. The light reduction portion 28 may also be a light absorption portion that absorbs the light from the second optical path L2. In the case of the light absorption portion, a light absorbing material that absorbs light, e.g., corundum such as ruby or sapphire, may be formed inside the optical path difference generating member 21.

Figure 5:
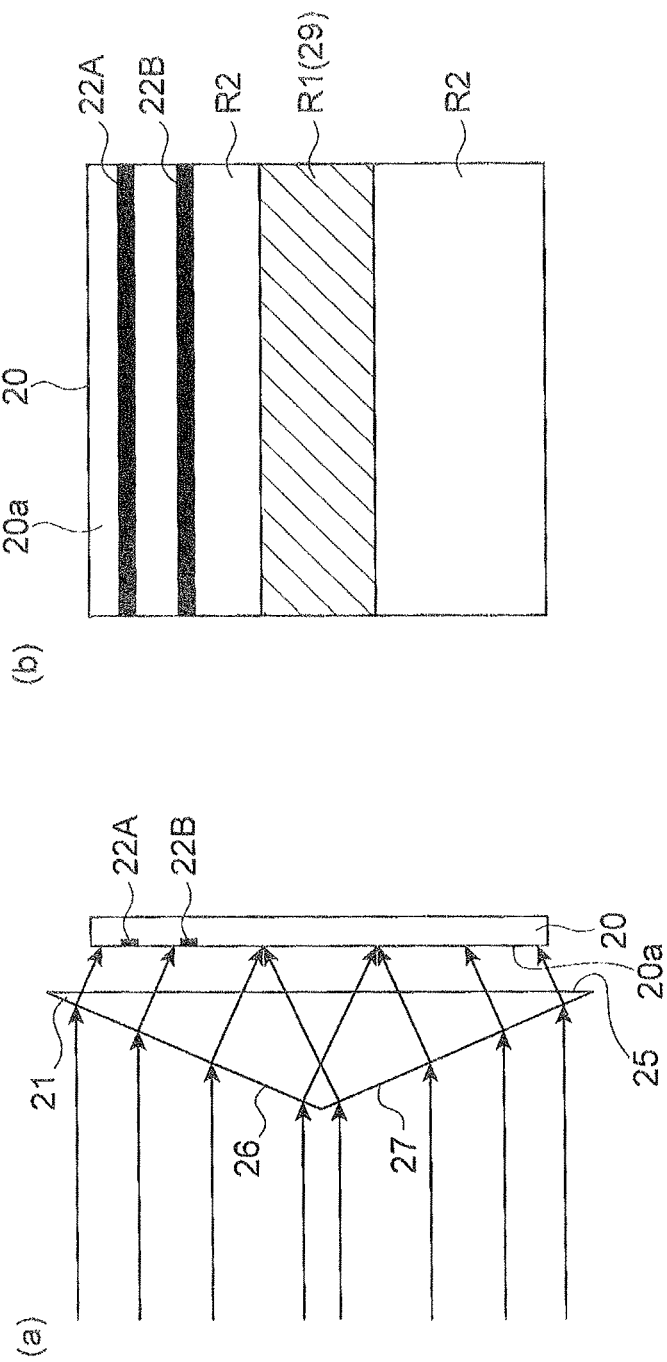
FIG. 5 is a drawing showing a situation in which light from a second optical path is incident to an imaging surface of the second imaging device, with no light reduction portion provided on the optical path difference generating member.

If the light reduction portion 28 is not provided on the optical path difference generating member 21, beams from the second optical path L2 incident to the vicinity of the apex 24 of the optical path difference generating member 21 will be superimposed on the imaging surface 20a because of refraction at the first face 26 and at the second face 27, as shown in FIG. 5(*a*), to form a light superimposed region 29 on the imaging surface 20a, as shown in FIG. 5(*b*). Since in the light superimposed region 29 the beams of different optical path differences are incident to the imaging surface 20a, it is a non-setting region R1 unsuitable for setting of the first imaging region 22A and the second imaging region 22B. If the width of the non-setting region R1 is large with respect to the imaging surface 20a, the width of setting regions R2 available for setting of the first imaging region 22A and the second imaging region 22B becomes relatively small. It is considered that with decrease in the width of the setting regions R2, for example, the set width of spacing between the first imaging region 22A and the second imaging region 22B will become more restricted and the adjustment width of focus difference between front focus and back focus will be more restricted.

Figure 6:
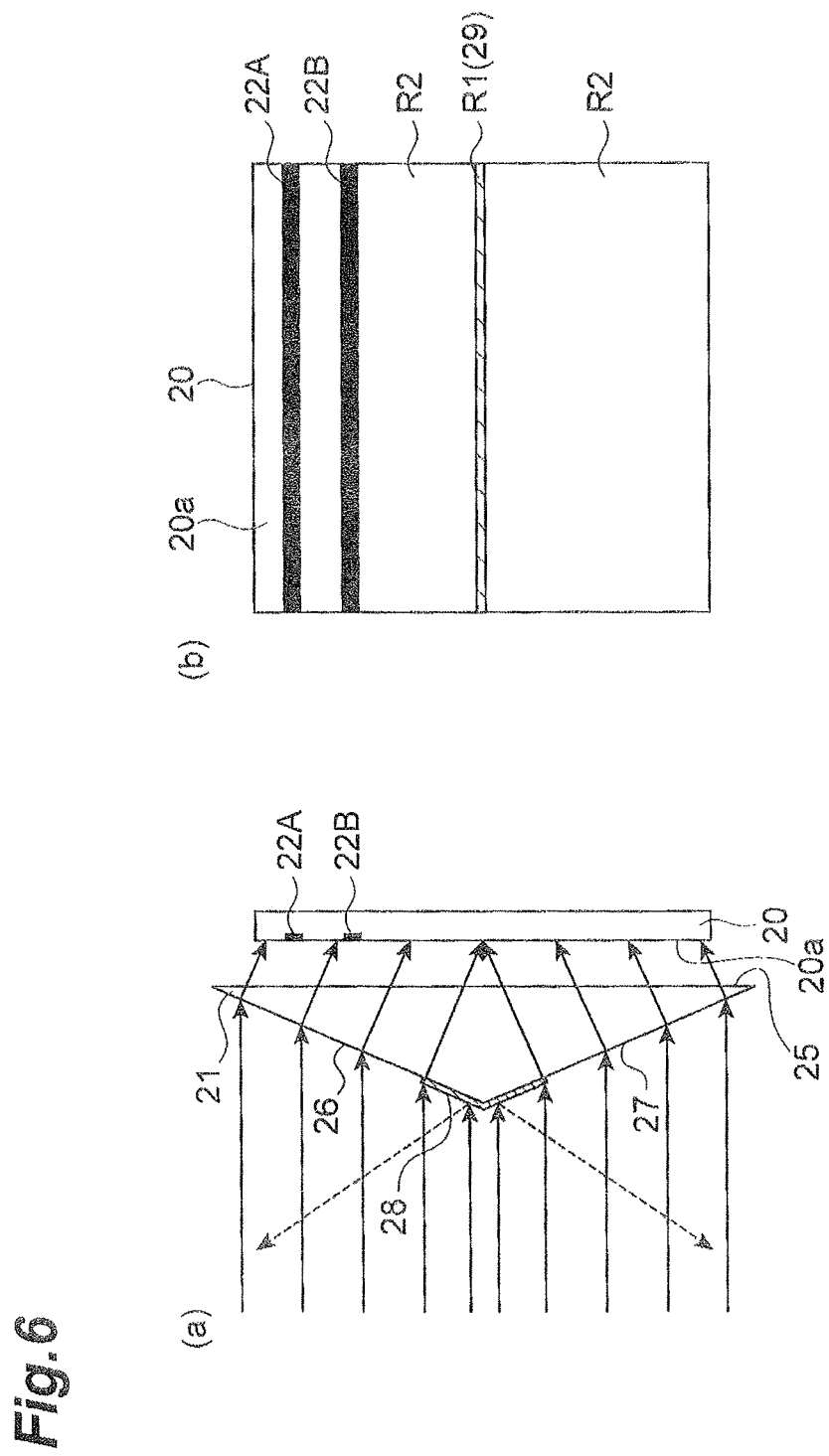
FIG. 6 is a drawing showing a situation in which the light from the second optical path is incident to the imaging surface of the second imaging device, with a light reduction portion (light reflection portion) provided on the optical path difference generating member.

In contrast to it, in the case where the optical path difference generating member 21 is provided with the light reduction portion 28 as a light reflection portion as in the present embodiment, the light from the second optical path L2 incident to the vicinity of the apex 24 of the optical path difference generating member 21 is reflected by the light reduction portion 28, as shown in FIG. 6(*a*). For this reason, as shown in FIG. 6(*b*), the width of the light superimposed region 29 formed on the imaging surface 20a is largely decreased, compared to the case where the optical path difference generating member 21 is not provided with the light reduction portion 28. Therefore, the width of the setting regions R2 available for setting of the first imaging region 22A and the second imaging region 22B is relatively increased, thereby securing a sufficient adjustment width of focus difference between front focus and back focus.

Figure 7:
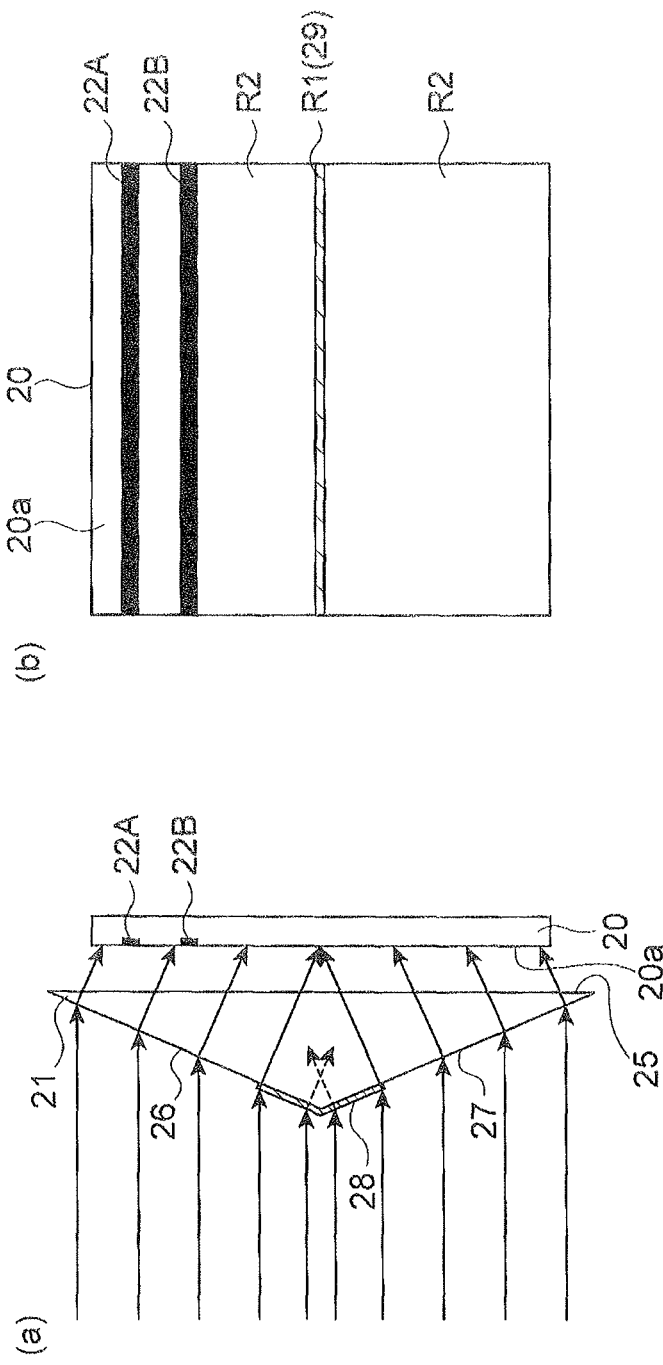
FIG. 7 is a drawing showing a situation in which the light from the second optical path is incident to the imaging surface of the second imaging device, with a light reduction portion (light attenuation portion, light block portion, or light absorption portion) provided on the optical path difference generating member.

Furthermore, when the optical path difference generating member 21 is provided with the light reduction portion 28 as a light attenuation portion•light block portion•light absorption portion as in the present embodiment, as shown in FIG. 7(*a*), the light from the second optical path L2 incident to the vicinity of the apex 24 of the optical path difference generating member 21 is attenuated, blocked, or absorbed by the light reduction portion 28. In this case, as shown in FIG. 7(*b*), the width of the light superimposed region 29 formed on the imaging surface 20a, i.e., the width of the non-setting region R1 can also be largely decreased, compared to the case where the optical path difference generating member 21 is not provided with the light reduction portion 28. Therefore, the width of the setting regions R2 available for setting of the first imaging region 22A and the second imaging region 22B is relatively increased, thereby securing a sufficient adjustment width of focus difference between front focus and back focus.

The width of the light reduction portion 28 is properly set depending upon the refractive index of the optical path difference generating member 21, the angles of inclination of the first face 26 and the second face 27 relative to the opposed face 25, and so on. For example, the width of the light reduction portion 28 is preferably set so that a ray refracted at a boundary region to the light reduction portion 28 on the first face 26 and a ray refracted at a boundary region to the light reduction portion 28 on the second face 27 both are directed to a central region of the imaging surface 20a (portion corresponding to the apex 24). In this case, the width of the non-setting region R1 can be minimized.

Figure 8:
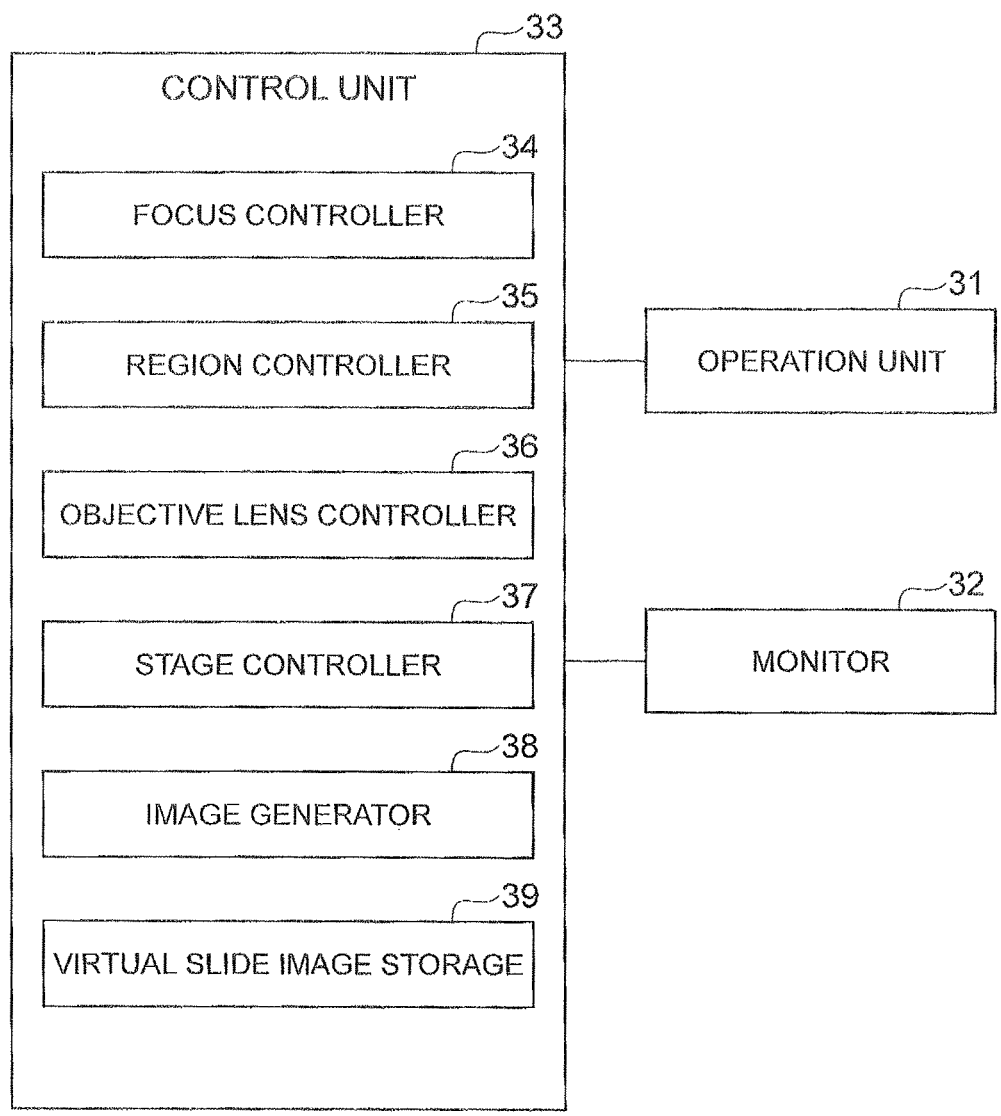
FIG. 8 is a block diagram showing functional constitutive elements of the image acquisition device.

FIG. 8 is a block diagram showing functional constitutive elements of the image acquisition device. As shown in the same drawing, the image acquisition device M has a computer system equipped with a CPU, a memory, a communication interface, a storage unit such as a hard disc, an operation part 31 such as a keyboard, a monitor 32, and so on. The image acquisition device M further has, as functional constitutive elements of a control unit 33, a focus controller 34, a region controller 35, an objective lens controller 36, a stage controller 37, an image generator 38, and a virtual slide image storage 39.

The focus controller 34 is a part that performs an analysis of the second image acquired by the second imaging device 20 and controls the focal position in imaging by the first imaging device 18, based on the result of the analysis. More specifically, the focus controller 34 first calculates a difference between a contrast value of the image acquired in the first imaging region 22A and a contrast value of the image acquired in the second imaging region 22B in the second imaging device 20.

When it is assumed herein, as shown in FIG. 9, that the focal position of the objective lens 15 is in focus with the surface of the sample S, approximate agreement is made between the image contrast value of front focus acquired in the first imaging region 22A and the image contrast value of back focus acquired in the second imaging region 22B, and the difference between them becomes approximately zero. On the other hand, when the distance to the surface of the sample S is longer than the focal length of the objective lens 15, as shown in FIG. 10, the image contrast value of back focus acquired in the second imaging region 22B is larger than that of front focus acquired in the first imaging region 22A, and the difference between them is positive. In this case, the focus controller 34 outputs instruction information to drive the objective lens 15 toward the sample S, to the objective lens controller 36.

Furthermore, when the distance to the surface of the sample S is shorter than the focal length of the objective lens 15, as shown in FIG. 11, the image contrast value of back focus acquired in the second imaging region 22B is smaller than that of front focus acquired in the first imaging region 22A, and the difference between them is negative. In this case, the focus controller 34 outputs instruction information to drive the objective lens 15 away from the sample S, to the objective lens controller 36.

The region controller 35 is a part that controls the position of the first imaging region 22A and the position of the second imaging region 22B on the imaging surface 20a of the second imaging device 20. The region controller 35 first sets the first imaging region 22A so as to avoid the light superimposed region 29 formed on the imaging surface 20a, based on an operation from the operation part 31, and, after completion of imaging in the first imaging region 22A, it releases the setting of the first imaging region 22A. Next, it sets the second imaging region 22B with a predetermined space in the Z-direction (scanning direction) from the first imaging region 22A, and, after completion of imaging in the second imaging region 22B, it releases the setting of the second imaging region 22B.

A waiting time from the imaging in the first imaging region 22A to the imaging in the second imaging region 22B is set, for example, based on the space between the first imaging region 22A and the second imaging region 22B and the scanning speed of the stage 1. The space between the first imaging region 22A and the second imaging region 22B is set based on an optical path length difference generated by the optical path difference generating member 21. However, this space in fact corresponds to a distance on the slide of the sample S and thus this space needs to be converted to the number of pixels of the second imaging region 22B eventually.

The region controller 35 can change at least one of the position of the first imaging region 22A and the position of the second imaging region 22B along the scanning direction (the Z-direction herein) in the plane of the imaging surface 20a, based on an operation from the operation part 31. In this case, only either one of the position of the first imaging region 22A and the position of the second imaging region 22B may be changed or both of the position of the first imaging region 22A and the position of the second imaging region 22B may be changed. Furthermore, both of the position of the first imaging region 22A and the position of the second imaging region 22B may be changed, while maintaining the space between the first imaging region 22A and the second imaging region 22B.

By changing the position of the first imaging region 22A and the position of the second imaging region 22B, it becomes possible to change the thickness t1 of the optical path difference generating member 21 where the second optical image to enter the first imaging region 22A passes, and the thickness t2 of the optical path difference generating member 21 where the second optical image to enter the second imaging region 22B passes. This changes the space between the front focus and the back focus, allowing adjustment of resolution in obtaining the difference between contrast values.

The objective lens controller 36 is a part that controls driving of the objective lens 15. When the objective lens controller 36 receives the instruction information output from the focus controller 34, it drives the objective lens 15 in the Z-direction, according to a content of the instruction information. This driving results in adjusting the focal position of the objective lens 15 with respect to the sample S.

Figure 12:
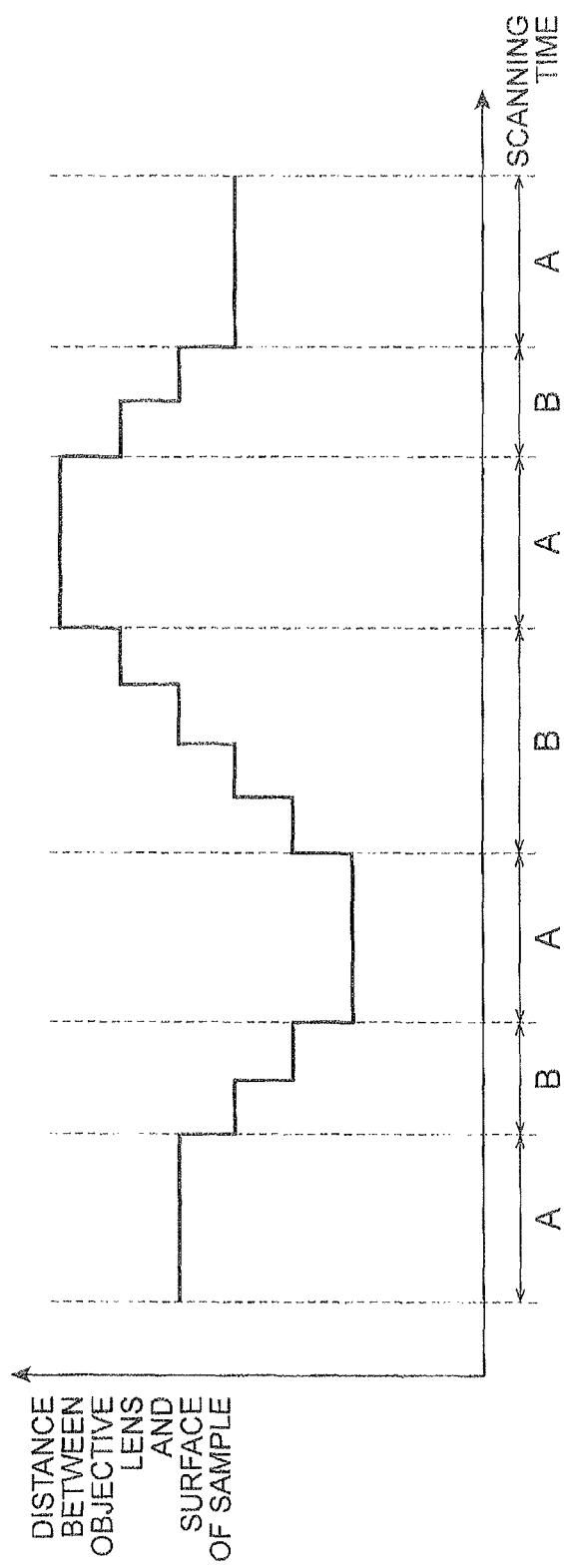
FIG. 12 is a drawing showing a relationship of the distance between the objective lens and the surface of the sample with scanning time of the stage.

The objective lens controller 36 does not implement the driving Of the objective lens 15 during the analysis of the focal position by the focus controller 34 and, drives the objective lens 15 only in one direction along the Z-direction until the next analysis of focal position is initiated. FIG. 12 is a drawing showing a relationship of the distance between the objective lens and the surface of the sample with the scanning time of the stage. As shown in the same figure, analysis periods A of focal position and objective lens drive periods B based on the analysis result are alternated during the scanning of the sample S. By keeping the positional relationship between the objective lens 15 and the sample S unchanged during the analysis of focal position in this manner, analysis accuracy of focal position can be guaranteed.

The stage controller 37 is a part that controls the driving of the stage 1. More specifically, the stage controller 37 implements scanning of the stage 1 with the sample S thereon at a predetermined speed, based on an operation from the operation part 31. This scanning of the stage 1 relatively sequentially moves the imaging fields of the sample S in the first imaging device 18 and in the second imaging device 20.

The scanning direction of the stage 1 to be adopted herein is bidirectional scanning, as shown in FIG. 13(a), which is carried out in such a manner that, after completion of scanning of one divisional region 40, the stage 1 is moved in a direction orthogonal to the scanning direction and the next divisional region 40 is then scanned in the opposite direction. The scanning direction to be adopted may also be one-directional scanning, as shown in FIG. 13(b), which is carried out in such a manner that the position of the stage 1 is returned to a scan start position every completion of scanning of one divisional region 40 and the next divisional region 40 is then scanned in the same direction. In this case, the first imaging region 22A and the second imaging region 22B can be set only in either one of the setting region R2 corresponding to the first face 26 and the setting region R2 corresponding to the second face 27, on the imaging surface 20a.

Figure 14:
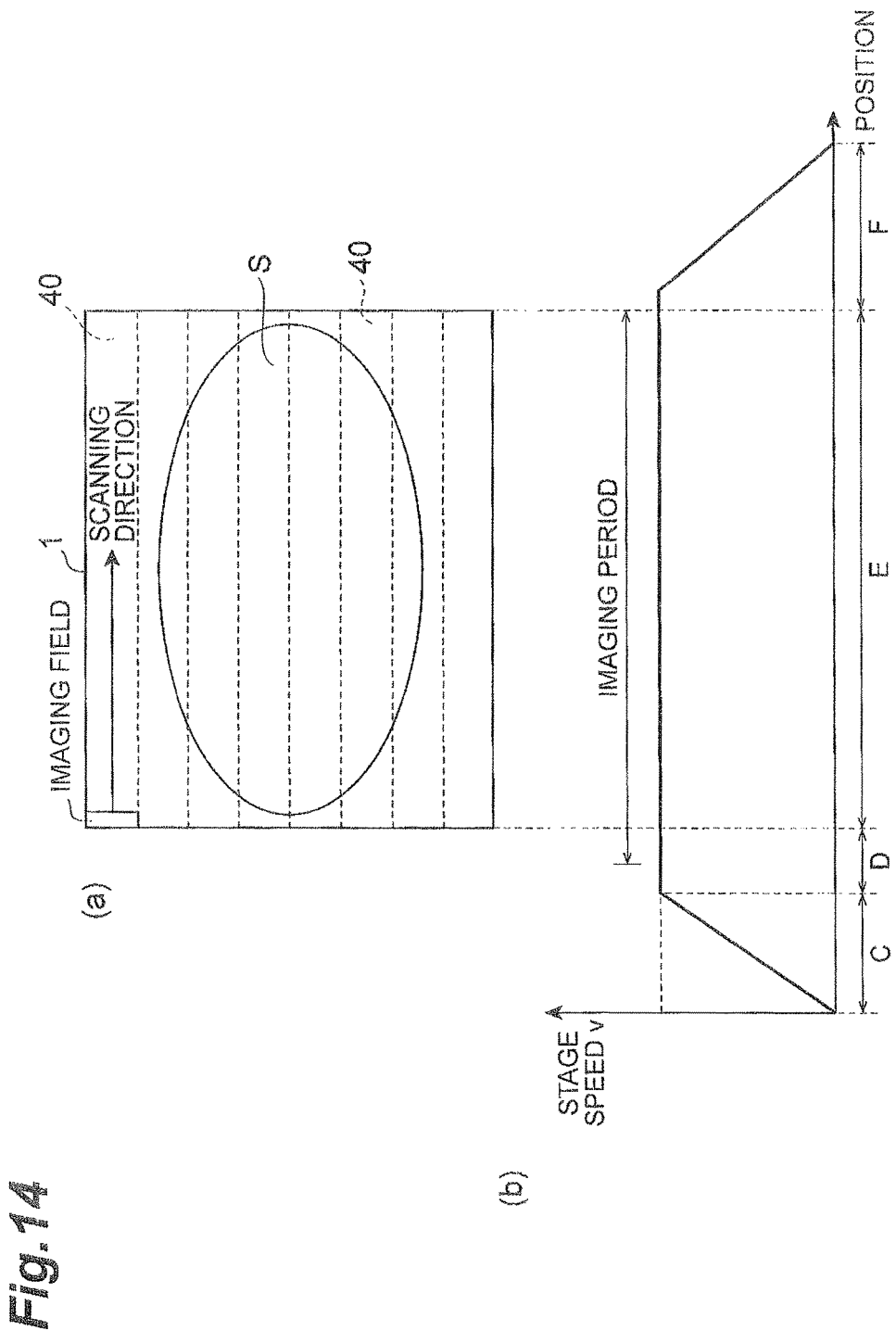
FIG. 14 is a drawing showing control of scanning speed of the stage by the stage controller.

The scanning speed of the stage 1 is constant during acquisition of images, but in fact there is an unstable period of scanning speed due to influence of vibration or the like of the stage 1 immediately after a start of scanning. For this reason, it is preferred, as shown in FIG. 14, to set a scanning width longer than the divisional regions 40 and make each of an acceleration period C for the stage 1 to accelerate, a stabilization period D for the scanning speed of the stage 1 to stabilize, and a deceleration period F for the stage 1 to decelerate, occur during scanning outside the divisional regions 40. This allows acquisition of images to be carried out in accord with a constant speed period E where the scanning speed of the stage 1 is constant. It is also possible to adopt a technique of starting imaging in the stabilization period D and deleting a data part acquired in the stabilization period D after acquisition of an image. Such a technique can be suitably applied to cases using imaging devices necessitating idle reading of data.

The image generator 38 is a part that combines acquired images to generate a virtual slide image. The image generator 38 sequentially receives the first images output from the first imaging device 18, i.e., images of the respective divisional regions 40 and combines these images to synthesize the entire image of the sample S. Then, based on this synthetic image, it creates an image of a lower resolution than the synthetic image and stores the high-resolution image and the low-resolution image in association with each other, into the virtual slide image storage 39. In the virtual slide image storage 39, the image acquired by the macro image acquisition device M1 may also be further associated with them. The virtual slide image may be stored as a single image or may be stored as a plurality of divided images.

The operation of the image acquisition device M described above will be described below.

Figure 15:
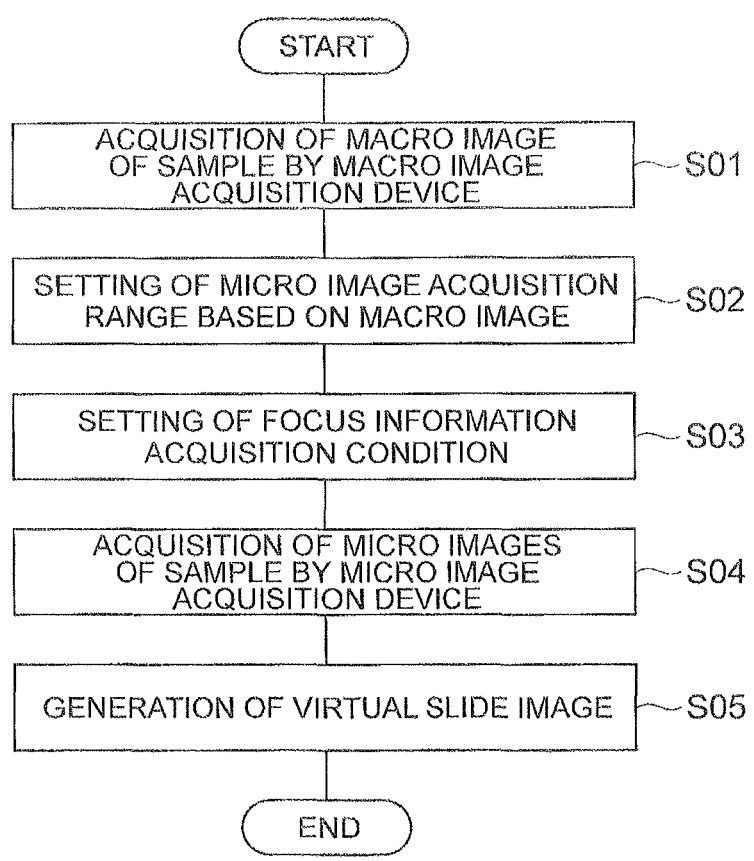
FIG. 15 is a flowchart showing an operation of the image acquisition device.

FIG. 15 is a flowchart showing the operation of the image acquisition device M. As shown in the same drawing, in the image acquisition device M, first, the macro image acquisition device M1 acquires the macro image of the sample S (step S01). The acquired macro image is binarized, for example, using a predetermined threshold, and is then displayed on the monitor 32, and a range for acquisition of micro images from the interior of the macro image is set by an automatic setting using a predetermined program or by a manual setting by an operator (step S02).

Next, the sample S is transferred to the micro image acquisition device M2 side and a focus acquisition condition is set (S03). In this step, as described above, the waiting time before a start of imaging in the second imaging region 22B is set based on the scanning speed of the stage 1 and the space between the first imaging region 22A and the second imaging region 22B.

After the setting of the focus acquisition condition, the scanning of the stage 1 is initiated to acquire the micro images of the respective divisional regions 40 of the sample S by the micro image acquisition device M2 (step S04). In acquisition of the micro images by the first imaging device 18, the second imaging device 20 analyzes the deviation direction of the objective lens 15 with respect to the sample S, based on the difference between the contrast value of front focus and the contrast value of back focus by the first imaging region 22A and the second imaging region 22B, and adjustment of the position of the objective lens 15 is carried out in real time. After completion of acquisition of the micro images for all the divisional regions 40, the acquired micro images are combined to generate a virtual slide image (step S05).

In the image acquisition device M, as described above, the optical path length difference in the second optical image can be formed by the arrangement of the optical path difference generating member, without need for splitting the light in the second optical path L2 for focus control. Therefore, it can reduce the quantity of light into the second optical path L2 necessary for acquisition of information of focal position, while ensuring the quantity of light enough for imaging by the first imaging device 18. Furthermore, this image acquisition device M can perform the bidirectional scanning to scan the imaging field of the sample S in two ways because the optical path difference generating member 21 has the first face 26 and the second face 27.

In the vicinity of the boundary between the first face 26 and the second face 27, the beams refracted at the first face 26 and at the second face 27 may be superimposed in part on the imaging surface 20a of the second imaging device 20. It is considered that the presence of the light superimposed region 29 on the imaging surface 20a would lead to degradation of the analysis accuracy of the second image in the focus controller 34. In contrast to it, this image acquisition device M is configured so that the light reduction portion 28 for reducing the light reaching the imaging surface 20a of the second imaging device 20 is provided between the first face 26 and the second face 27. This light reduction portion 28 can narrow the light superimposed region 29 on the imaging surface 20a of the second imaging device 20, so as to ensure adequate freedom of adjustment of the focus difference between front focus and back focus in the setting regions R2. Therefore, the control of the focal position to the sample S can be carried out with accuracy.

Figure 16:
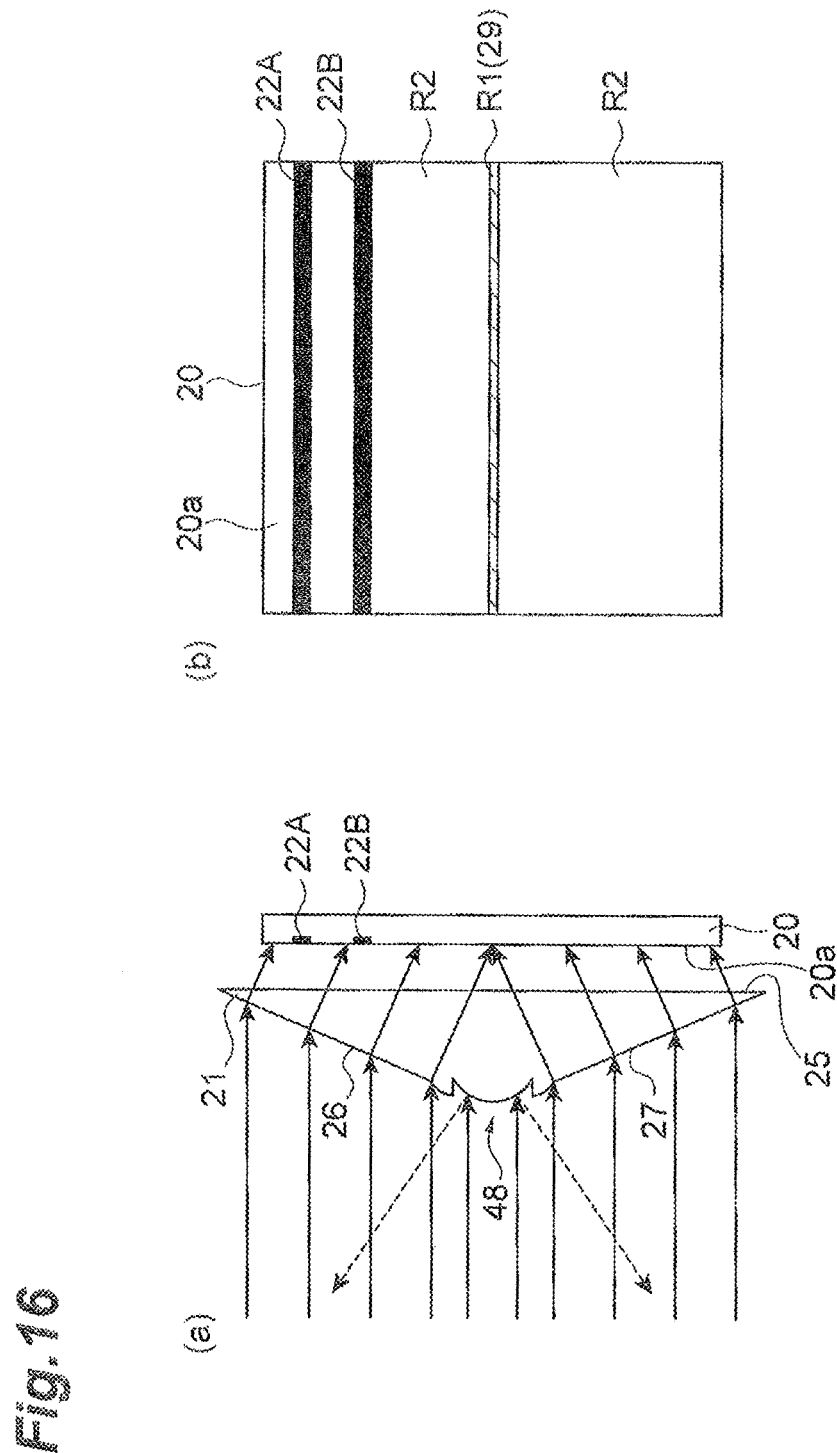
FIG. 16 is a drawing showing a modification example of the light reduction portion (light reflection portion).

The above embodiment employed the light reflection portion made of the metal foil as the light reduction portion 28, but the portion near the apex made by the first face 26 and the second face 27 may be formed in a Fresnel lens shape so as to serve as a light reflection portion, for example, like a light reduction portion 48 shown in FIG. 16(a). The Fresnel lens shape is a lens shape obtained by dividing an ordinary lens into concentric ring regions so as to reduce the thickness, and its cross-sectional shape is sawtooth. The light reduction portion 48 of this configuration can also narrow the light superimposed region 29 on the imaging surface 20a of the second imaging device 20, as shown in FIG. 16(b), whereby the control of the focal position to the sample S can be accurately carried out.

Figure 17:
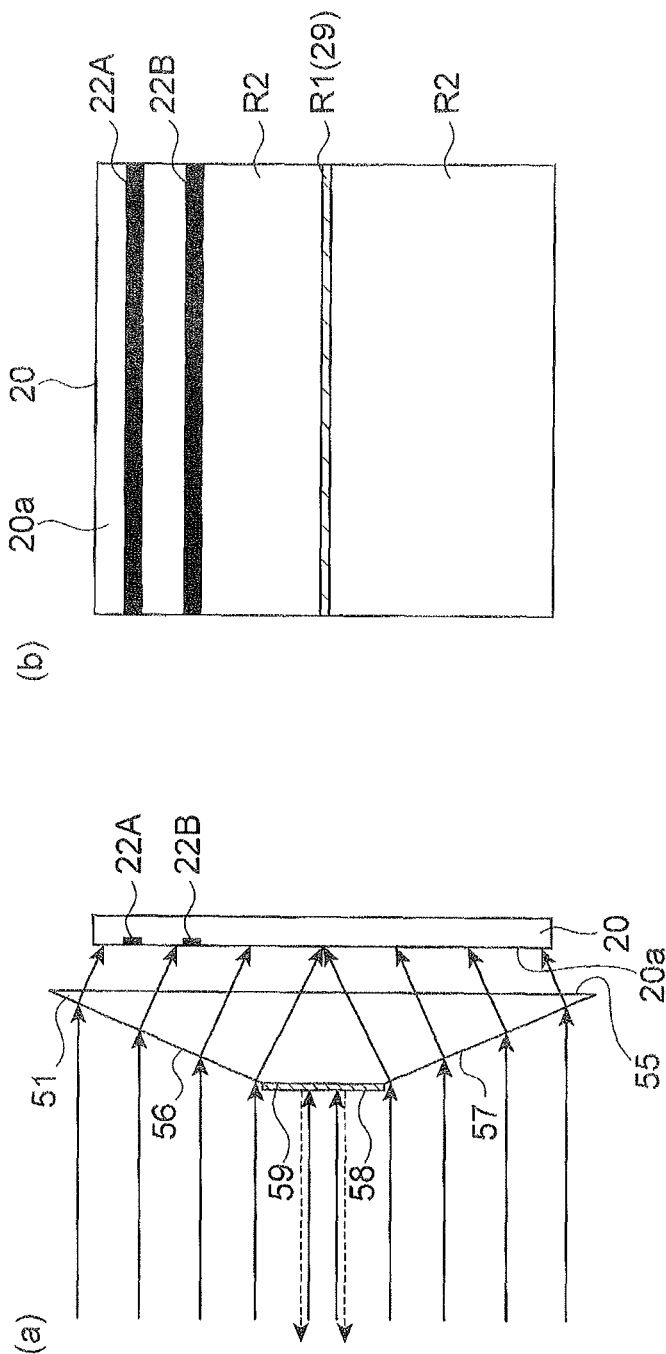
FIG. 17 is a drawing showing a modification example of the optical path difference generating member and light reduction portion.

The above embodiment uses the optical path difference generating member 21 having the first face 26 and the second face 27 tilted relative to the plane orthogonal to the optical axis of the second optical path L2, but the device may also be configured using an optical path difference generating member 51 of a prism shape with a trapezoid cross section having a third face 59 orthogonal to the optical axis of the second optical path L2 (or parallel to an opposed face 55) between a first face 56 and a second face 57, as shown in FIG. 17(a). In this optical path difference generating member 51, a light reduction portion 58 is provided, for example, over the entire area of the third face 59. The light reduction potion 58 of this configuration can also narrow the light superimposed region 29 on the imaging surface 20a of the second imaging device 20, as shown in FIG. 17(b), whereby the control of the focal position to the sample S can be accurately performed. In the example of FIG. 17, the light reduction portion 58 is illustrated as a light reflection portion, but it may be a light attenuation portion, a light block portion, or a light absorption portion.

Furthermore, as shown in FIG. 18(a), the device may be configured using an optical path difference generating member 61 obtained by combining a first member 62 of a prism shape with a triangular cross section having a first face 66 and a second member 63 of a prism shape with a triangular cross section having a second face 67. In this optical path difference generating member 61, a light reduction portion 68 is provided over the entire area of inner walls of a recess 65 formed when the first member 62 and the second member 63 are arranged next to each other. The light reduction portion 68 of this configuration can also narrow the light superimposed region 29 on the imaging surface 20a of the second imaging device 20, as shown in FIG. 18(b), whereby the control of the focal position to the sample S can be accurately carried out.

Figure 18:
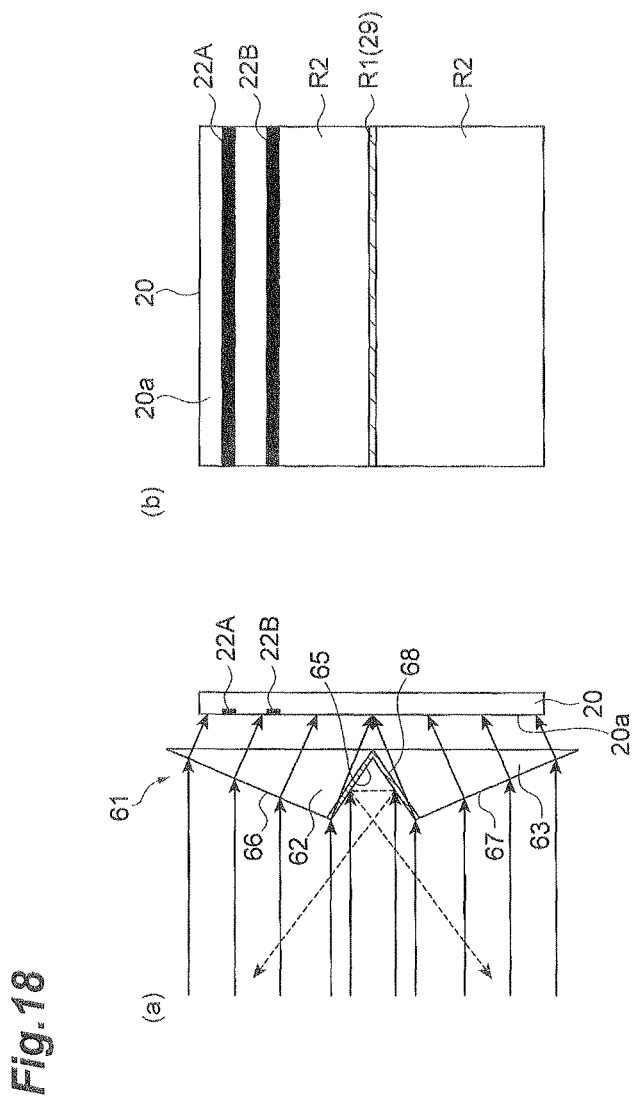
FIG. 18 is a drawing showing another modification example of the optical path difference generating member and light reduction portion.
Figure 19:
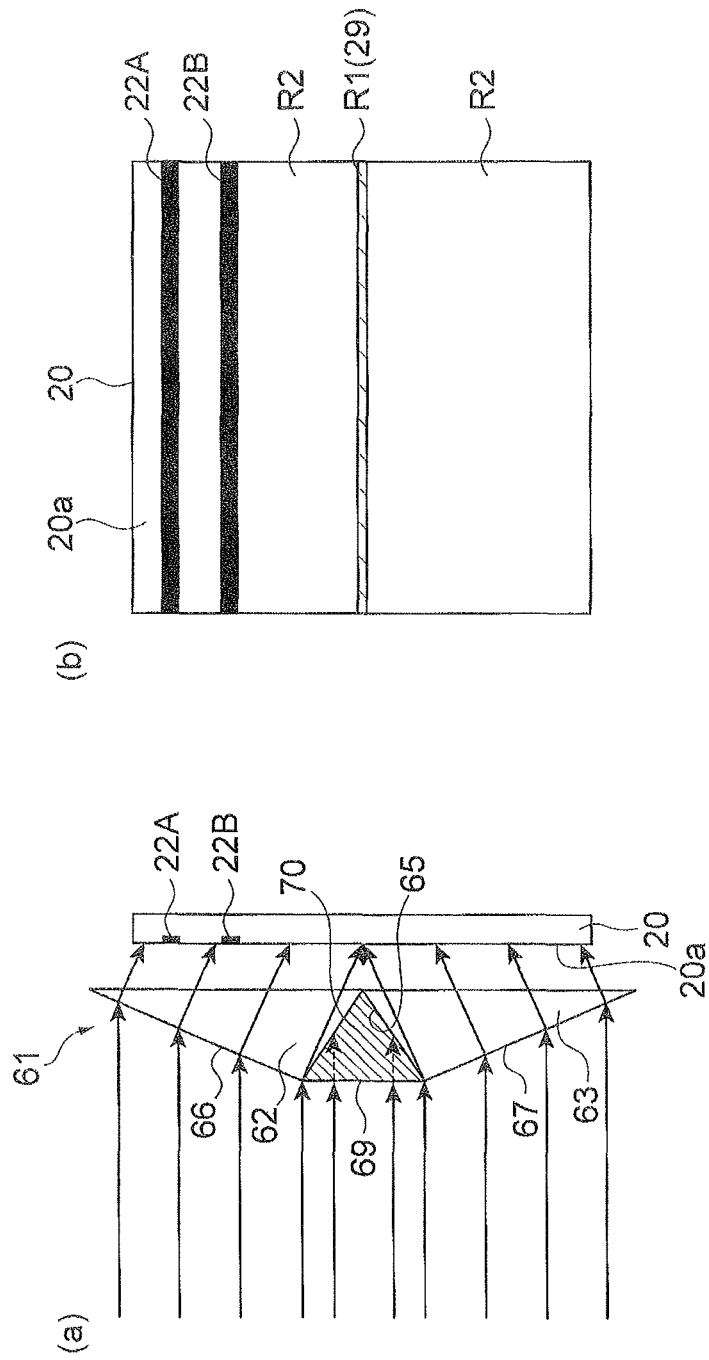
FIG. 19 is a drawing showing still another modification example of the optical path difference generating member and light reduction portion.

Instead of forming the light reduction portion 68 on the inner walls of the recess 65, a light reduction portion 70 of a prism shape with a triangular cross section may be arranged in the recess 65, as shown in FIG. 19(a). In this case, the bottom face of the light reduction portion 70 corresponds to a third face 69 and the light reduction portion 70 is provided on the third face 69. The light reduction portion 70 of this configuration can also narrow the light superimposed region 29 on the imaging surface 20a of the second imaging device 20, as shown in FIG. 19(b), whereby the control of the focal position to the sample S can be accurately carried out. In the example of FIG. 18, the light reduction portion 68 is illustrated as a light reflection portion, but it may be a light attenuation portion, a light block portion, or a light absorption portion. Similarly, in the example of FIG. 19, the light reduction portion 70 is illustrated as a light absorption portion, but it may be a light reflection portion, a light attenuation portion, or a light absorption portion.

The device may also be configured as follows: the second imaging device 20 is configured using a two-dimensional image pickup element having a plurality of pixel rows and being capable of rolling readout; and the second image is acquired by performing the rolling readout of each pixel row in synchronism with the scanning of the stage 1 by the stage controller 37. An example of the two-dimensional image pickup element capable of rolling readout, which is applicable herein, is a CMOS image sensor.

Figure 20:
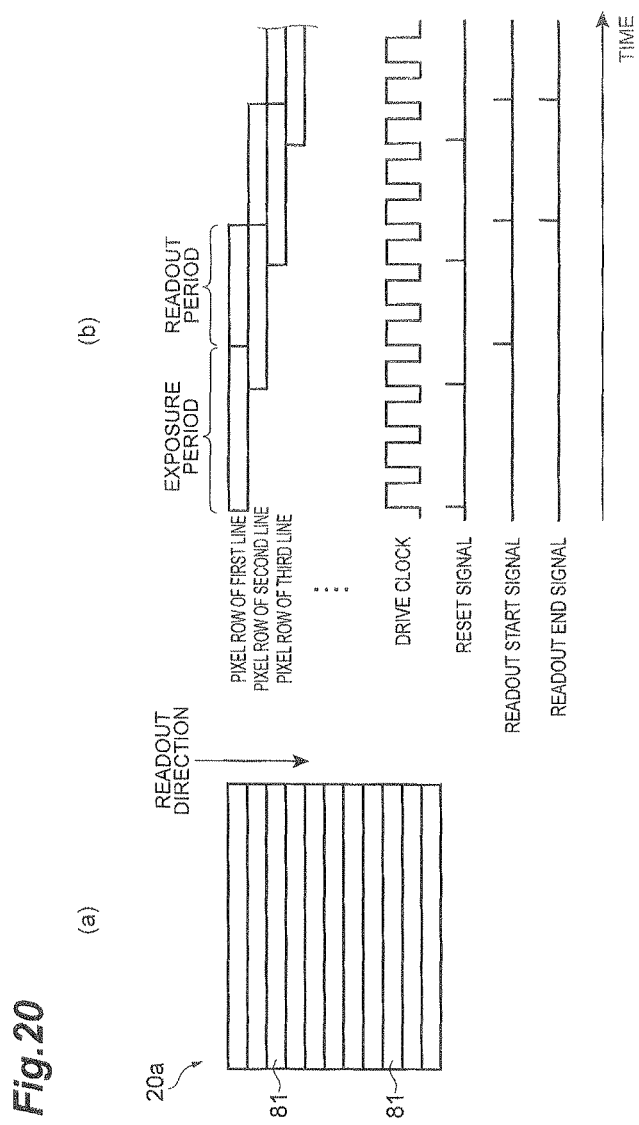
FIG. 20 is a drawing showing the second imaging device using an image pickup element capable of rolling readout.

In this case, a plurality of pixel rows 81, each of which consists of a plurality of pixels arranged in a direction perpendicular to the readout direction, are arranged in the readout direction, as shown in FIG. 20(a), on the imaging surface 20a. In the image pickup element, as shown in FIG. 20(b), reset signals, readout start signals, and readout end signals are output based on the drive period of drive clock, thereby to control exposure and readout for each of the pixel rows 81. An exposure period for one pixel row 81 is a duration from discharge of electric charges with a reset signal to a start of readout of electric charges with a readout start signal. Furthermore, a readout period for one pixel row 81 is a duration from a readout start of electric charges with a readout start signal to a readout end of electric charges with a readout end signal. It is also possible to use a readout start signal for a subsequent pixel row as the readout end signal.

In the rolling readout, the readout start signals to be output for the respective pixel rows are sequentially output with a predetermined time difference in between. The readout speed in the rolling readout is controlled by the time interval between the readout start signals for readout of the respective pixel rows 81. The readout speed increases with decrease in the time interval between the readout start signals, and the readout speed decreases with increase in the time interval between the readout start signals. The readout interval between adjacent pixel rows 81, 81 can be adjusted, for example, by techniques of adjusting the frequency of the drive clock, setting a delay period in the readout period, changing a clock count to define the readout start signal, and so on.

When the rolling readout is synchronized with the scanning of the stage 1 by the stage controller 37, optical images from an identical part of the sample S are incident to each pixel row 81. In the optical images, optical path length differences are made by the optical path difference generating member 21 or the like arranged in the second optical path L2. For this reason, without need for driving the objective lens 15 by the objective lens controller 36, image data from each pixel row 81 comes to include the contrast information with change in the focal position of the objective lens 15 at the same part of the sample S. Therefore, when two pixel rows 81 are selected as front focus and back focus out of the pixel rows 81, the deviation direction of the objective lens 15 relative to the sample S can be analyzed based on the difference between the contrast value of front focus and the contrast value of back focus.

Figure 21:
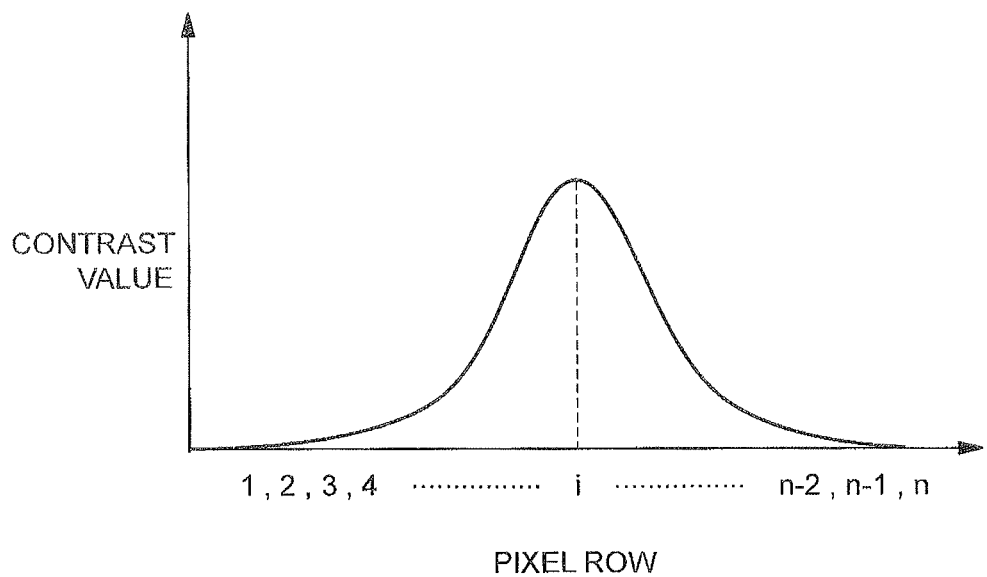
FIG. 21 is a drawing showing an example of contrast information to be processed by a focus controller in the case of FIG. 20.

It is also possible to obtain the focal point information on the basis of a distribution of contrast values included in the pixel rows 81 without selection of front focus and back focus. In the example shown in FIG. 21, contrast values of image data are illustrated from the pixel row 81 of the first line to the pixel row 81 of the $n^{th}$ line and a peak value is the contrast value of image data at the pixel row 81 of the $i^{th}$ line. In this case, the focus controller 34 calculates the focal point information of the objective lens 15 to the sample S, based on the optical path length of light incident on the pixel row 81 of the $i^{th}$ line.

When the second imaging device 20 is configured using the two-dimensional image pickup element capable of rolling readout as described above, the arrangement of the optical path difference generating member 21 or the like in the second optical path L2 eliminates the need for driving the objective lens 15 for calculation of the focal point information of the objective lens 15. Therefore, it can suppress occurrence of vibration or the like during the focus control, in addition to the operational effect of the above embodiment.

The foregoing embodiment exemplified the example of the device for generating the virtual slide image but the image acquisition device according to the present invention can be applied to various devices as long as they are devices for acquiring the image while scanning the sample at a predetermined speed by means of the stage or the like.

REFERENCE SIGNS LIST 1 stage; 12 light source; 14 lightguide optical system; 15 objective lens; 16 beam splitter (light splitting means); 18 first imaging device (first imaging means); 20 second imaging device (second imaging means); 20a imaging surface; 21, 51, or 61 optical path difference generating member; 22A first imaging region; 22B second imaging region; 26, 56, or 66 first face; 27, 57, or 67 second face; 28, 48, 58, 68, or 70 light reduction portion; 29 light superimposed region; 34 focus controller (focus control means); 35 region controller (region control means); 36 objective lens controller (objective lens control means); 59 or 69 third face; 81 pixel rows; L1 first optical path; L2 second optical path; M image acquisition device; M1 macro image acquisition device; M2 micro image acquisition device; S sample.

The invention claimed is:

1. An apparatus for capturing an image comprising:
a stage configured to support a sample;
a light source configured to emit light to the sample;
a light dividing unit optically coupled to the objective lens and configured to divide an optical image of at least a portion of the sample through the objective lens into a first optical path and a second optical path;
a first image sensor configured to capture a first optical image split into the first optical path;
a second image sensor configured to capture a second optical image split into the second optical path and provide image data;
a focus controller configured to analyze the image data so as to control a focal position of the objective lens based on the result of the analysis; and
an optical path difference generating member configured to generate an optical path difference in the second optical image along an in-plane direction of an imaging surface of the second image sensor,
wherein the optical path difference generating member has a first face and a second face tilted relative to a plane orthogonal to an optical axis of the second optical path,
wherein a light reduction portion for educing light reaching the imaging surface is provided between the first face and the second face, and
wherein the optical path difference generating member has a third face orthogonal to the optical axis of the second optical path between the first face and the second face, and the light reduction portion is provided on the third face.

2. The apparatus of claim 1, wherein the first face and the second face are adjacent to each other, and the light reduction portion is provided so as to include a boundary region between the first face and the second face.

3. The apparatus of claim 1, wherein the light reduction portion is a light reflection portion for reflecting the light from the second optical path.

4. The apparatus of claim 1, wherein the light reduction portion is a light attenuation portion for attenuating the light from the second optical path.

5. The apparatus of claim 1, wherein the light reduction portion is a light block portion for blocking the light from the second optical path.

6. The apparatus of claim 1, wherein the light reduction portion is a light absorption portion for absorbing the light from the second optical path.

7. The apparatus of claim 1, further comprising:
a controller configured to set a first imaging region and a second imaging region on the imaging surface of the second image sensor so as to avoid a light superimposed region where beams refracted at the first face and at the second face of the optical path difference generating member are superimposed.

8. The apparatus of claim 1, wherein the second image sensor has a two-dimensional image pickup element having a plurality of pixel rows and being capable of rolling readout, and the second optical image is acquired by performing rolling readout of each pixel row in synchronism with the scanning of the stage by the stage control means.

9. A method for capturing an image of a sample, the method comprising:
acquiring an optical image of at least a portion of a sample supported on a stage by an objective lens;
dividing the optical image into a first optical path and a second optical path;
capturing a first optical image split into the first optical path and a second optical image split into the second optical path
capturing the second optical image split into the first optical path and providing image data; and
arranging in the second optical path an optical path difference generating member having a first face and a second face tilted relative to a plane orthogonal to an optical axis of the second optical path and adapted to generate an optical path difference in the second optical image along an in-plane direction of an imaging surface of the second image sensor; and
providing a light reduction portion between the first face and the second face to reduce light reaching the imaging surface of the second image sensor,
wherein the optical path difference generating member has a third face orthogonal to the optical axis of the second optical path between the first face and the second face, and the light reduction portion is provided on the third face.

* * * * *